US012739005B2

(12) United States Patent
Lee et al.

(10) Patent No.: US 12,739,005 B2
(45) Date of Patent: Sep. 15, 2026

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Eunjong Lee, Seoul (KR); Sangrim Lee, Seoul (KR); Bonghoe Kim, Seoul (KR); Kyungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 18/692,252

(22) PCT Filed: Sep. 17, 2021

(86) PCT No.: PCT/KR2021/012880

§ 371 (c)(1),
(2) Date: Mar. 14, 2024

(87) PCT Pub. No.: WO2023/042945

PCT Pub. Date: Mar. 23, 2023

(65) Prior Publication Data

US 2025/0141515 A1 May 1, 2025

(51) Int. Cl.
*H04W 24/10* (2009.01)
*H04B 7/06* (2006.01)

(52) U.S. Cl.
CPC .......... *H04B 7/0626* (2013.01); *H04W 24/10* (2013.01)

(58) Field of Classification Search
CPC ..... H04W 24/10; H04W 72/02; H04W 72/04; H04W 72/21; H04W 72/23; H04W 72/50;
(Continued)

(56) References Cited

U.S. PATENT DOCUMENTS 11,784,694 B2 * 10/2023 Kang .................. H04B 7/0417 375/267
2020/0259575 A1 8/2020 Bai et al.
(Continued)

FOREIGN PATENT DOCUMENTS

CN 111526537 8/2020

OTHER PUBLICATIONS

PCT International Application No. PCT/KR2021/012880, International Search Report dated Jun. 15, 2022, 7 pages.
(Continued)

*Primary Examiner* — Bo Hui A Zhu
(74) *Attorney, Agent, or Firm* — LEE, HONG, DEGERMAN, KANG & WAIMEY

(57) ABSTRACT

The present disclosure relates to a method and an apparatus for operating in a wireless communication system, the method comprising the operations of: receiving configuration information related to CSI prediction; and deriving predicted CSI for a second time point later than a first time point from CSI for the first time point, based on the configuration information, wherein based on the predicted CSI satisfying an event, actual CSI for the second time point, measured from a reference signal is transmitted, and wherein based on the predicted CSI not satisfying the event, CSI reporting for the second time point is dropped.

15 Claims, 18 Drawing Sheets

(58) Field of Classification Search
CPC ..... H04W 72/51; H04W 72/52; H04W 72/53; H04W 72/54; H04W 72/56
See application file for complete search history.

(56) References Cited

U.S. PATENT DOCUMENTS

2022/0377751 A1* 11/2022 Kotaru .................. H04L 5/0057
2022/0417776 A1* 12/2022 Manolakos ........... H04L 5/0048

OTHER PUBLICATIONS

Cordina, "Cross-Layer Design For Multi-View Video Plus Depth Transmission Over LTE Networks In Crowd Event Scenarios," Department of Communications and Computer Engineering, University of Malta, Dissertation for the degree of Doctor of Philosophy in Communications Engineering, 2018, 273 pages.
InterDigital Inc., "Summary of additional discussions on CSI feedback enhancements for enhanced URLLC/IIoT after RAN1#104-e," 3GPP TSG RAN WG1 #104b-e, R1-2102749, Apr. 2021, 99 pages.
Qualcomm Incorporated, "CSI enhancement for IOT and URLLC," 3GPP TSG RAN WG1 #104-e, R1-2101460, Jan. 2021, 18 pages.

* cited by examiner (a)

METHOD AND APPARATUS FOR TRANSMITTING AND RECEIVING WIRELESS SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2021/012880, filed on Sep. 17, 2021, the contents of which are all incorporated by reference herein in its entirety.

TECHNICAL FIELD

The disclosure relates to a wireless communication system, and more particularly to a method and device for transmitting and receiving a wireless signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An objective of the disclosure is to provide a method of effectively performing a procedure of transmitting and receiving a wireless signal and a device therefor.

It will be appreciated by persons skilled in the art that the objects that could be achieved with the disclosure are not limited to what has been particularly described hereinabove and the above and other objects that the disclosure could achieve will be more clearly understood from the following detailed description.

In a first aspect of the disclosure, a method of transmitting channel state information (CSI) by a user equipment (UE) is provided, including: receiving configuration information related to CSI prediction; and deriving predicted CSI for a second time point (i.e., a future time point) later than a first time point (i.e., a past time point) from CSI for the first time point, based on the configuration information. Based on the predicted CSI satisfying an event, actual CSI for the second time point, measured from a reference signal is transmitted, and based on the predicted CSI not satisfying the event, CSI reporting for the second time point is dropped.

In a second aspect of the disclosure, a UE used in a wireless communication system is provided, including: at least one radio frequency (RF) unit: at least one processor; and at least one computer memory operatively connected to the at least one processor, and when executed, causing the at least one processor to perform operations. The operations include: receiving configuration information related to CSI prediction; and deriving predicted CSI for a second time point (i.e., a future time point) later than a first time point (e.g., a past time point) from CSI for the first time point, based on the configuration information. Based on the predicted CSI satisfying an event, actual CSI for the second time point, measured from a reference signal is transmitted, and based on the predicted CSI not satisfying the event, CSI reporting for the second time point is dropped.

In a third aspect of the disclosure, an apparatus for a UE is provided, including: at least one processor; and at least one computer memory operatively connected to the at least one processor, and when executed, causing the at least one processor to perform operations. The operations include: receiving configuration information related to CSI prediction; and deriving predicted CSI for a second time point later than a first time point from CSI for the first time point, based on the configuration information. Based on the predicted CSI satisfying an event, actual CSI for the second time point, measured from a reference signal is transmitted, and based on the predicted CSI not satisfying the event, CSI reporting for the second time point is dropped.

In a fourth aspect of the disclosure, a computer-readable storage medium is provided, including at least one computer program which when executed, causes at least one processor to perform operations. The operations include: receiving configuration information related to CSI prediction; and deriving predicted CSI for a second time point later than a first time point from CSI for the first time point, based on the configuration information. Based on the predicted CSI satisfying an event, actual CSI for the second time point, measured from a reference signal is transmitted, and based on the predicted CSI not satisfying the event, CSI reporting for the second time point is dropped.

In a fifth aspect of the disclosure, a method of receiving CSI by a base station (BS) in a wireless communication system is provided, including: transmitting configuration information related to CSI prediction; and deriving predicted CSI for a second time point (i.e., a future time point) later than a first time point (i.e., a past time point) from CSI for the first time point, based on the configuration information. Based on the predicted CSI satisfying an event, actual CSI for the second time point, measured from a reference signal is received, and based on the predicted CSI not satisfying the event, CSI reception for the second time point is dropped.

In a sixth aspect of the disclosure, a BS used in a wireless communication system is provided, including at least one RF unit: at least one processor; and at least one computer memory operatively connected to the at least one processor, and when executed, causing the at least one processor to perform operations. The operations include: transmitting configuration information related to CSI prediction; and deriving predicted CSI for a second time point (i.e., a future time point) later than a first time point (i.e., a past time point) from CSI for the first time point, based on the configuration information. Based on the predicted CSI satisfying an event, actual CSI for the second time point, measured from a reference signal is received, and based on the predicted CSI not satisfying the event, CSI reception for the second time point is dropped.

Preferably, the event may include a mismatch between the predicted CSI for the second time point and the actual CSI for the second time point.

Preferably, the event may include the predicted CSI for the second time point being less than a threshold.

Preferably, the event may include the predicted CSI for the second time point being equal to or greater than a threshold.

Preferably, the event may include a difference between the predicted CSI for the second time point and the actual CSI for the second time point greater than a threshold.

Preferably, the event may include expiration of a timer, and the timer may start when CSI reporting is dropped and end when CSI reporting is transmitted.

According to the disclosure, a wireless signal may be transmitted and received efficiently in a wireless communication system.

It will be appreciated by persons skilled in the art that the effects that may be achieved with the disclosure are not limited to what has been particularly described hereinabove and other advantages of the disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Embodiments of the disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the disclosure, for simplicity, this technology will be referred to as NR (New Radio or New RAT).

For the sake of clarity, 3GPP NR is mainly described, but the technical idea of the disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
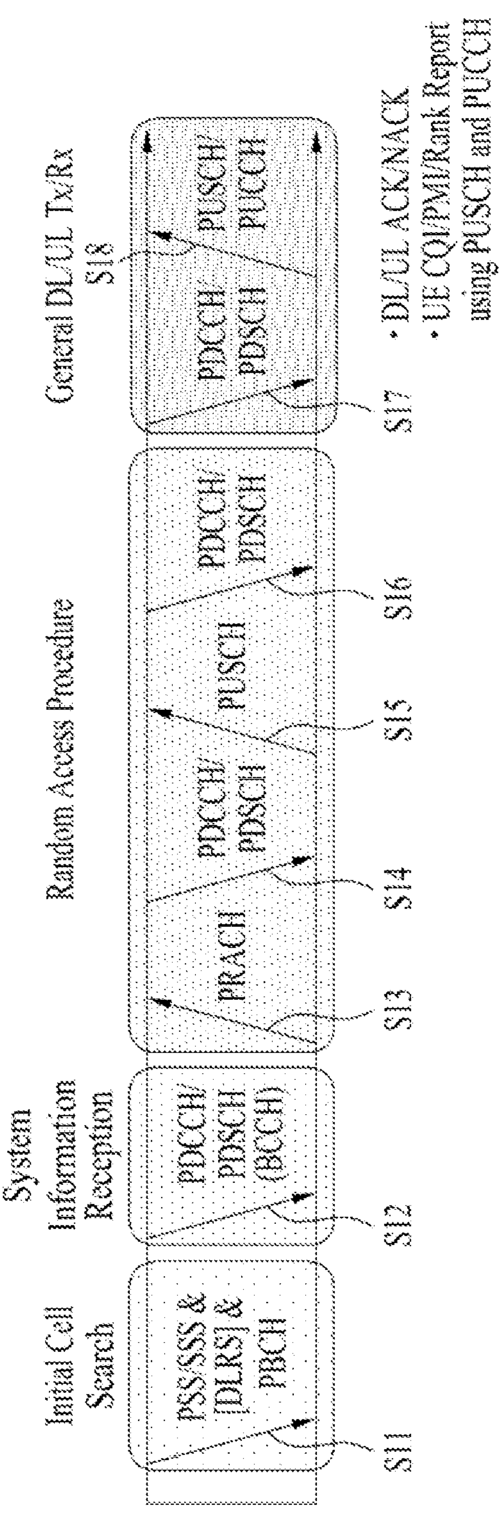
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
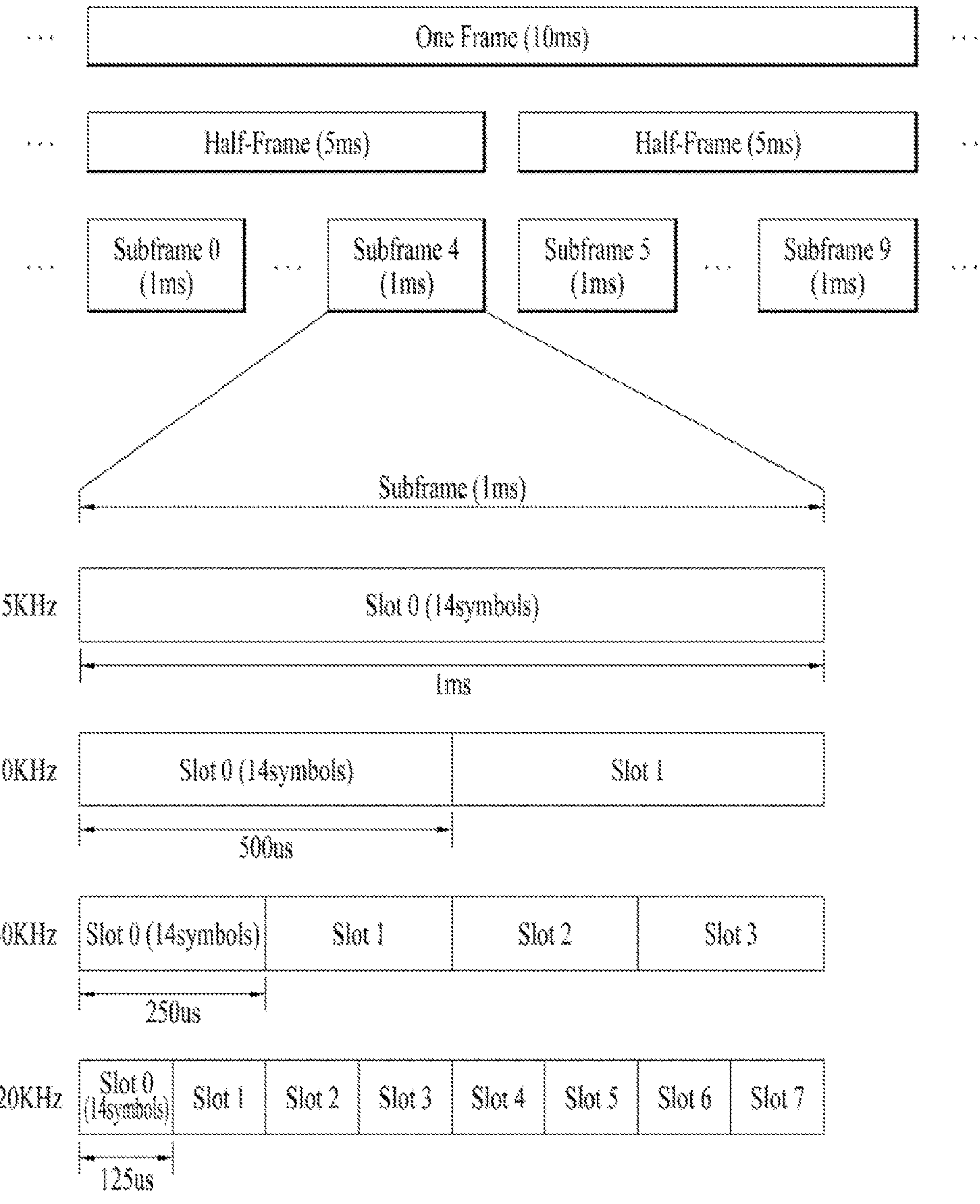
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 24 0KHz (u = 4) | 14 | 160 | 16 |

* $N_{symb}^{slot}$: Number of symbols in a slot
* $N_{slot}^{frame,u}$: Number of slots in a frame
* $N_{slot}^{subframe,u}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol).

Figure 3:
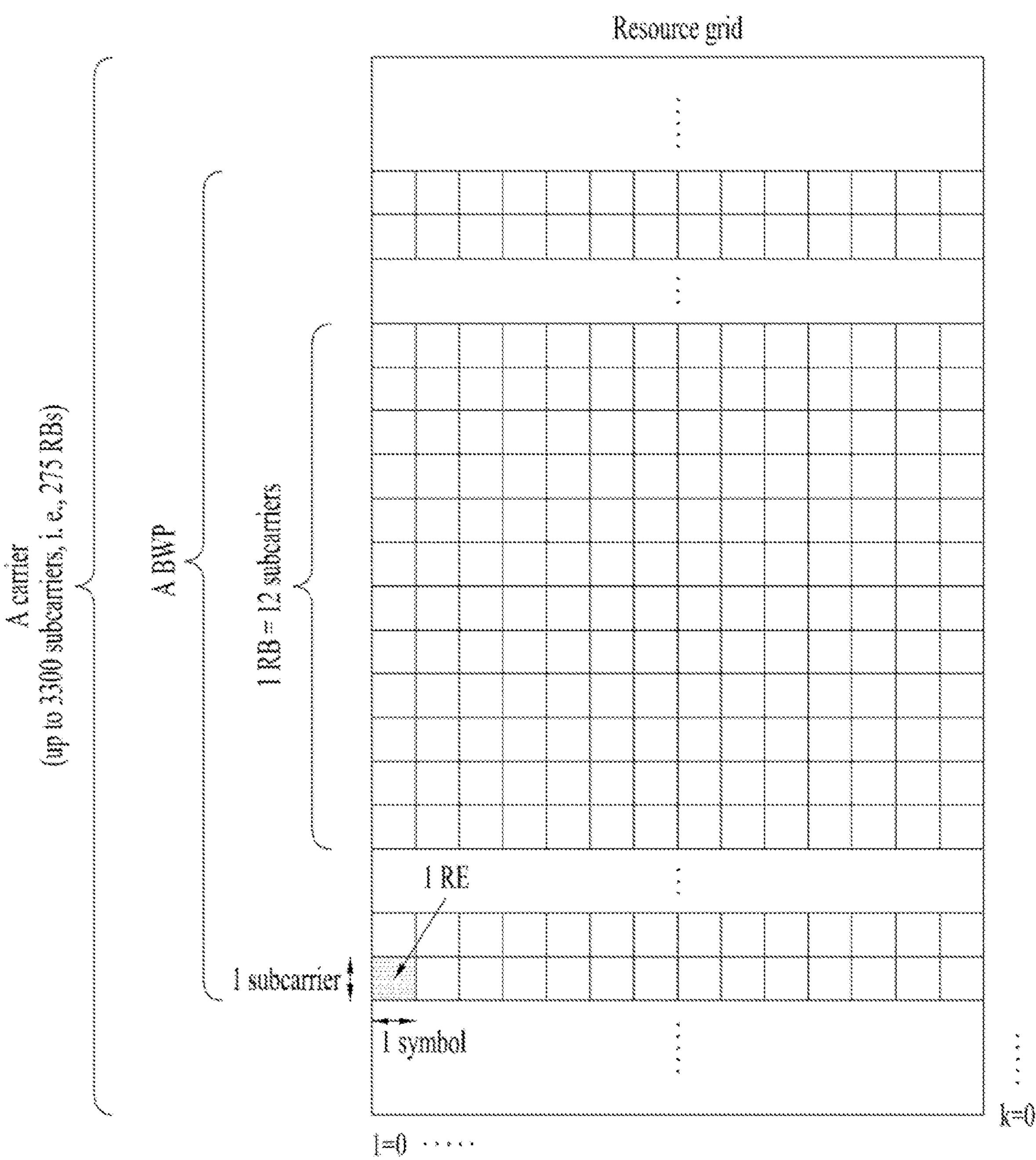
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
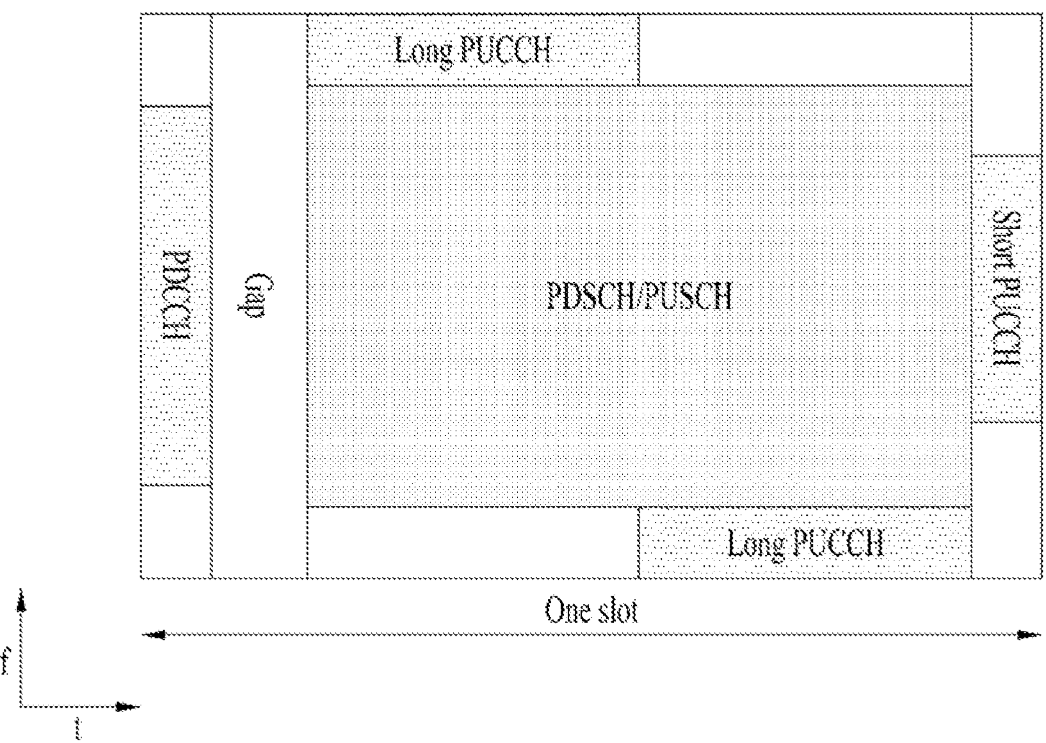
FIG. 4 illustrates mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols of a slot may be used for a DL control channel (e.g., PDCCH) (hereinafter, referred to as a DL control region), and the last M symbols of the slot may be used for a UL control channel (e.g., PUCCH) (hereinafter, referred to as a UL control region). Each of N and M is an integer equal to or larger than 0. A resource area (referred to as a data region) between the DL control region and the UL control region may be used for transmission of DL data (e.g., PDSCH) or UL data (e.g., PUSCH). A guard period (GP) provides a time gap for switching between a transmission mode and a reception mode at the BS and the UE. Some symbol at the time of switching from DL to UL may be configured as a GP.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

In NR, the UE uses a CSI report to report a channel state. Result values of the following components may be reported to a network (NW).

CQI (Channel Quality Information)
PMI (Precoding Matrix Indicator)
CRI (CSI-RS Resource Indicator)
SSBRI (SS/PBCH Resource Block Indicator)
LI (Layer Indicator)
RI (Rank Indicator) and/or L1-RSRP CSI reporting may be described in two parts: configuration and triggering. The NW may configure CSI reporting configuration information for each element. The UE may configure resource information to be measured and a result value to be reported by receiving, from the NW, an RRC message including a CSI resource configuration and CSI reporting configuration information mapped to it. Since CSI transmission is preceded by reference signal (RS) measurement, CSI reporting is configured in conjunction with RS (e.g., CSI-RS) resource configuration information for CSI, and the BS considers configurable RS resources, when configuring a CSI reporting method.

Figure 5:
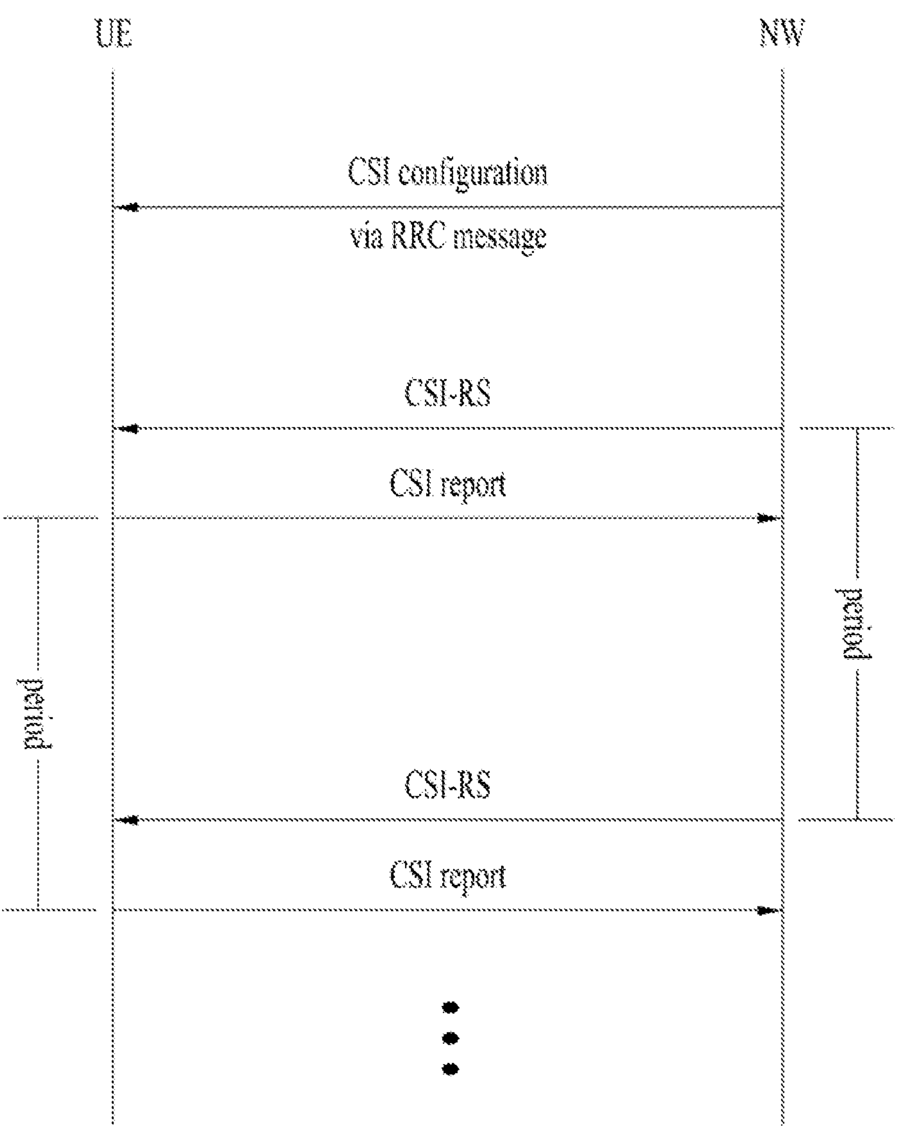
FIGS. 5 to 7 illustrate a channel state information (CSI) reporting process.

Currently, NR may support periodic, aperiodic, and semi-persistent CSI reporting methods. Periodic CSI reporting will first be described. Referring to FIG. 5, the UE may receive CSI configuration information through an RRC message. The UE may also receive configuration information for CSI-RS resources which are transmitted periodically. For example, the UE may receive CSI configuration information through an RRC message, and the CSI configuration information may include CSI-RS resource information and CSI-RS reporting information (e.g., a reporting periodicity/offset and PUCCH resources). The UE may then periodically measure the quality of periodically transmitted CSI-RS resources and periodically transmit a CSI report. Periodic CSI reporting may be configured preferably for a UE that experiences frequent channel changes, and the BS may more accurately identify a channel state because it periodically receives a report of the channel state. A short CSI reporting period may result in resource overhead issues due to increased resource uses for the CSI-RS as well as CSI feedbacks. On the contrary, a long CSI reporting period may increase resource use efficiency, although it may cause the problem of outdated CSI, which makes it difficult to obtain accurate CSI at a time when it is needed.

Figure 6:
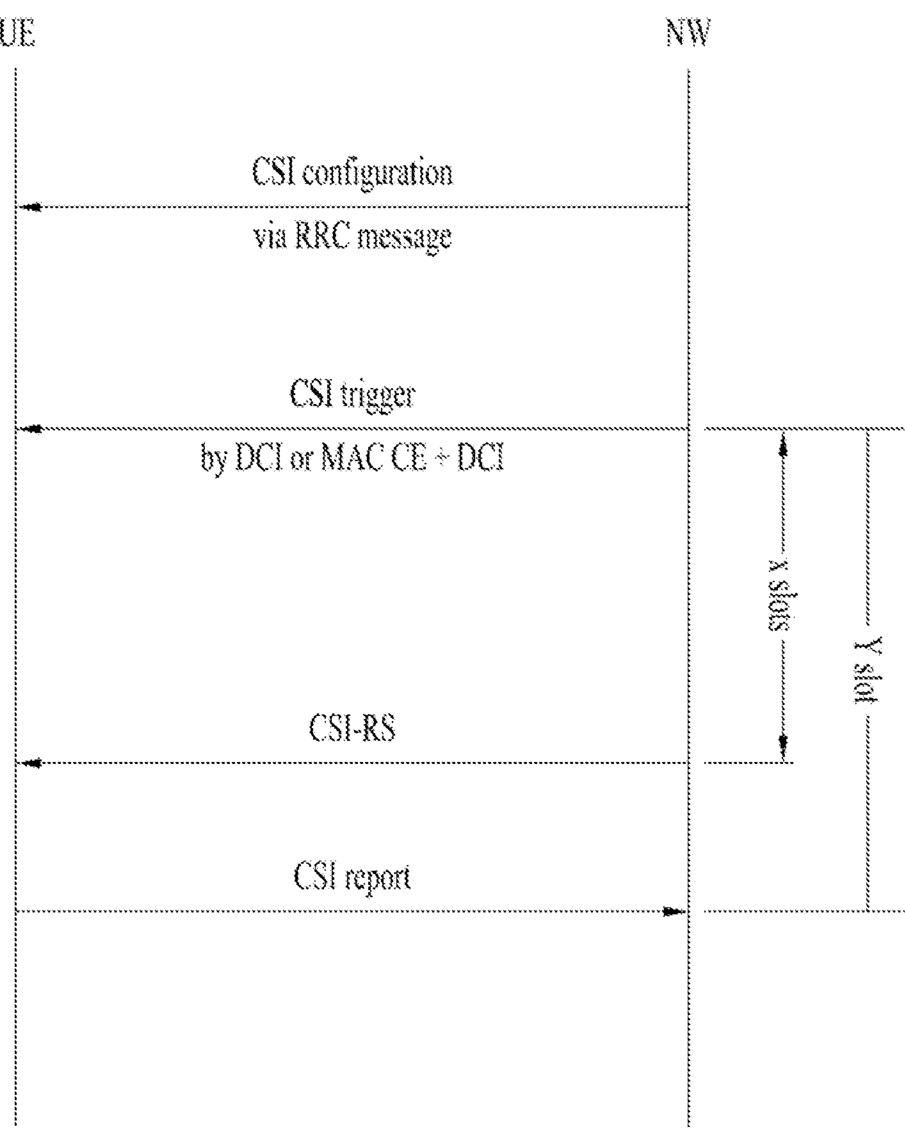

Now, aperiodic CSI reporting will be described. Referring to FIG. 6, aperiodic CSI reporting may be configured for the UE by an RRC message. Then, upon receipt of a CSI triggering signal through a lower layer (e.g., the medium access control (MAC) layer or the physical (PHY) layer), the UE may receive/measure CSI-RS resources and report a CSI-RS measurement result. In other words, CSI reporting is performed as instructed by the BS, whenever required, and upon receipt of a CSI triggering signal (e.g., a CSI request) through DCI or a MAC control element (CE)+DCI, the UE may measure the CSI-RS after x slots and report CSI after y slots. In aperiodic CSI reporting, therefore, a delay of y slots from CSI triggering to CSI reporting occurs each time.

Figure 7:
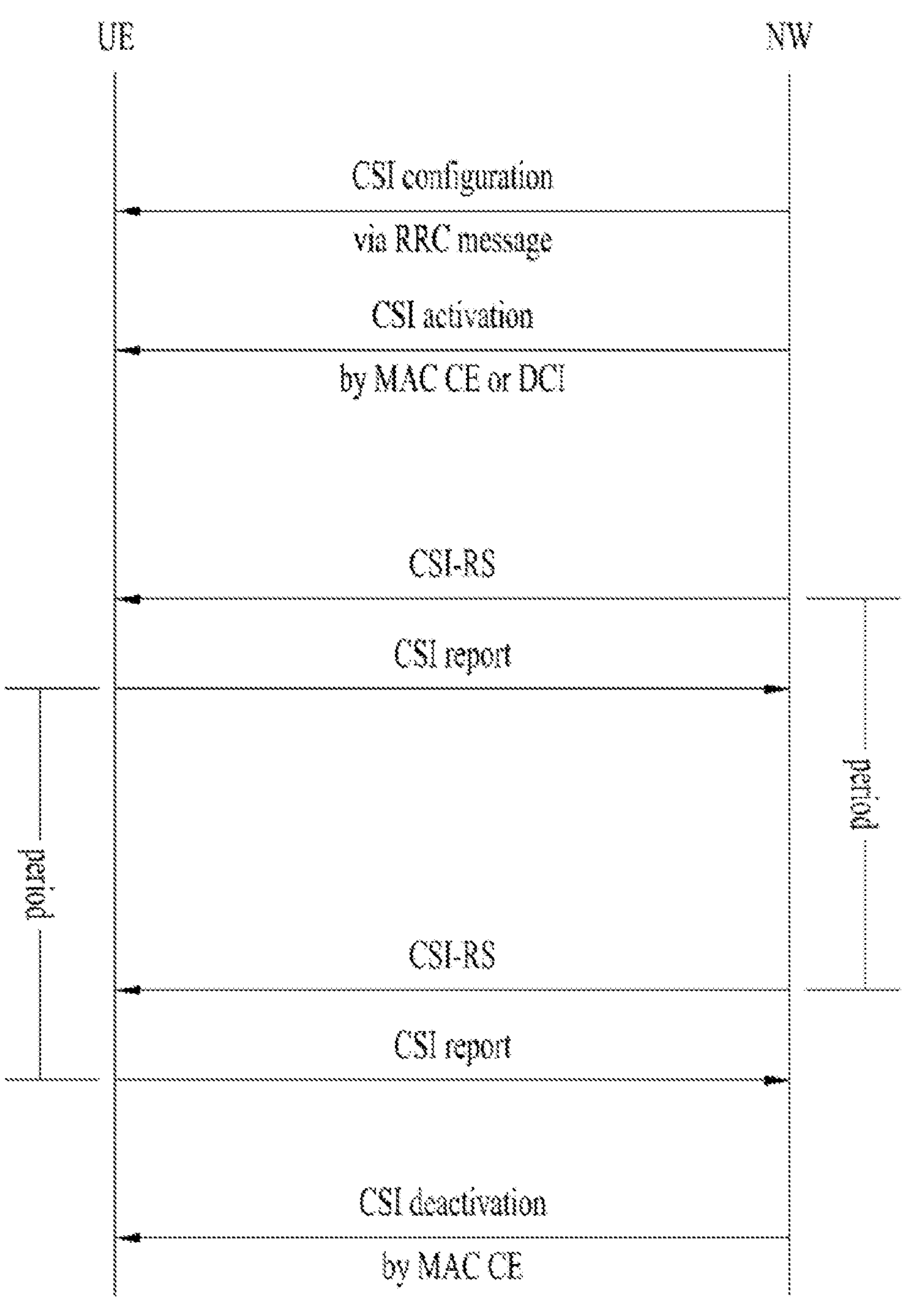

Semi-persistent CSI reporting will be described. Semi-persistent CSI reporting is a hybrid of periodic CSI reporting and aperiodic CSI reporting, which compensates for the shortcomings of periodic CSI reporting and aperiodic CSI reporting. Referring to FIG. 7, the UE may receive a CSI configuration through an RRC message and perform periodic CSI reporting, when needed. Specifically, when CSI reporting is activated by a MAC CE or DCI, the UE may periodically measure and report on the CSI-RS according to a periodicity set by the RRC message. That is, the UE may perform periodic measurement and reporting until instructed to deactivate it. Although semi-persistent CSI reporting was defined to overcome the disadvantages of periodic CSI reporting and aperiodic CSI reporting, it also suffers from the disadvantages of both periodic CSI reporting and aperiodic CSI reporting, because CSI reporting is performed through activation/deactivation signaling based on NW decisions.

As described above, conventional aperiodic CSI reporting requires a triggering signal each time, because CSI may be reported only when instructed based on NW decisions. Therefore, the triggering signal causes a delay each time CSI is reported. In contrast, periodic CSI reporting has no triggering signal delay, but with increased resource overhead.

Embodiment: AI-Based CSI Reporting

The 3GPP has worked on standardization of a 5G system called new RAT (hereafter, NR), and discussion is underway on a 6G system as a successor to the 5G system.

The 6G system is aimed at (i) very high data rates per device, (ii) a very large number of connected devices, (iii) global connectivity, (iv) very low latency, (v) lower energy consumption for battery-free IoT devices, (vi) ultra-reliable connectivity, and (vii) connected intelligence with machine learning capabilities. The vision of the 6G system may be four aspects such as intelligent connectivity, deep connectivity, holographic connectivity, and ubiquitous connectivity, and the 6G system may fulfill the requirements as listed in Table 3.

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

One of new techniques that will be introduced in the 6G system is artificial intelligence (AI). The 4G system does not involve AI, and the 5G system will have partial or very limited AI support. However, in the 6G system, AI may be fully supported for automation. Advances in machine learning will create a more intelligent network for real-time communications in 6G. The introduction of AI in communications may streamline and improve real-time data transmission. AI may use numerous analytics to determine how complex target tasks are to be performed. Time-consuming tasks such as handover, network selection, and resource scheduling may be performed instantly by using AI. AI may also play an important role in M2M, machine-to-human, and human-to-machine communications.

In recent years, there have been attempts to integrate AI with wireless communication systems, mainly focusing on the application layer, the network layer, and especially application of deep learning to wireless resource management and allocation. However, this research is increasingly moving to the MAC layer and the PHY layer, and there are attempts to combine deep learning with wireless transmission, especially at the PHY layer. AI-driven PHY layer transmission means that underlying signal processing and communication mechanisms are based on AI drivers rather than traditional communication frameworks. For example, it may include deep learning-based channel coding and decoding, deep learning-based signal estimation and detection, deep learning-based MIMO mechanisms, AI-based resource scheduling and allocation, and so on.

Machine learning may be used for channel estimation and channel tracking, and for power allocation, interference cancellation, and so on at the PHY layer of DL. Machine learning may also be used for antenna selection, power control, symbol detection, and so on in a MIMO system.

As AI has recently been applied to communication techniques, CSI prediction has been proposed as one of methods to solve the problem of outdated CSI. CSI prediction aims to prevent system performance degradation caused by the difficulty of receiving a report of the latest CSI for a rapidly changing channel at a desired time. Specifically, CSI prediction may allow for acquisition of more accurate CSI for a rapidly changing channel by training on channel changes using a history of past CSI changes as well as environmental factors that may affect the channel to predict CSI at a point in the near future. CSI prediction may be largely categorized into prediction in the time domain and prediction in the frequency domain. Conventional CSI reporting methods involve frequent CSI-RS transmissions and frequent feedback transmissions to the network to obtain accurate CSI for a rapidly changing channel. The prior art increases not only RS transmissions but also feedback transmissions and receptions, resulting in an overall signaling/resource overhead problem.

Figure 8:
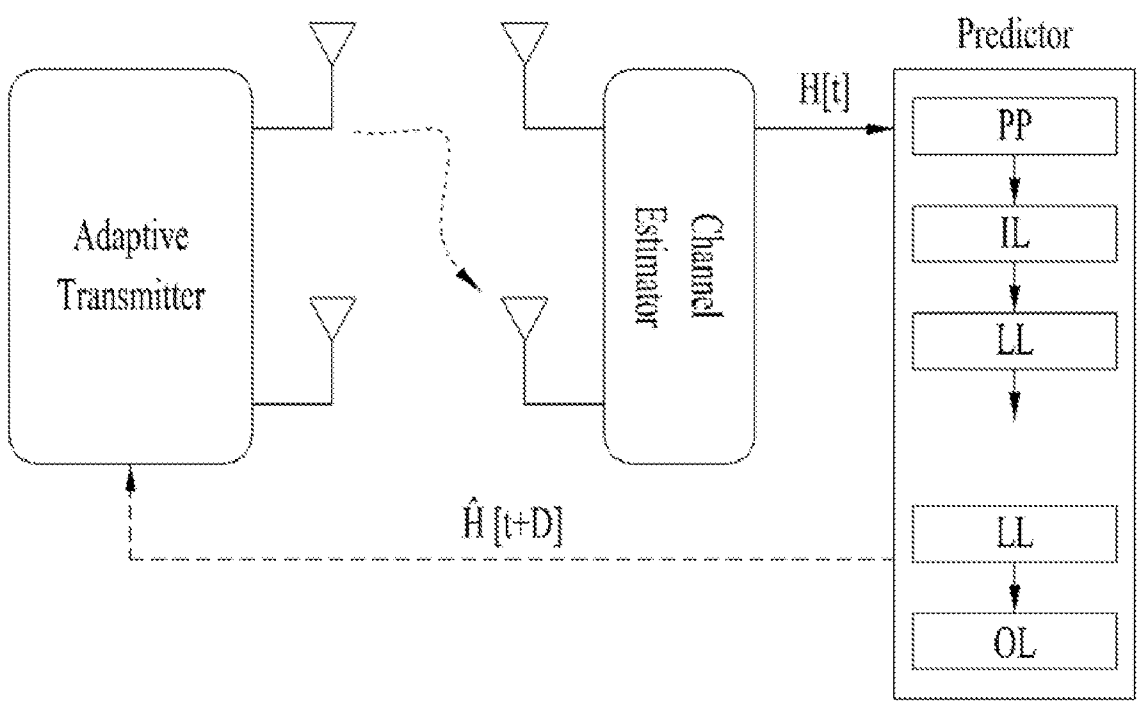
FIG. 8 illustrates a CSI prediction method.

FIG. 8 is a block diagram illustrating an implementation of a CSI predictor. Referring to FIG. 8, the CSI predictor may predict H[t+D] using H[t] as an input, where H[t] represents a channel matrix at time t, and the predicted H[t+D] represents a predicted channel matrix for time t+D. The predicted H[t+D] corresponds to prediction in the time domain. The CSI predictor may be implemented in a BS and/or a UE. The CSI predictor may be configured based on AI and trained to predict a channel state for a time point in the near future, using a channel state history and/or an environmental factor that may affect a channel. The CSI predictor may be implemented by referring to an AI model introduced in the document "Deep Learning for Fading Channel Prediction, IEEE ComSoc, April 2020" or "Channel State Information Prediction for 5G Wireless Communications: A Deep Learning Approach, IEEE TRANSACTIONS ON NETWORK SCIENCE AND ENGINEERING, January-March 2020".

Figure 9:
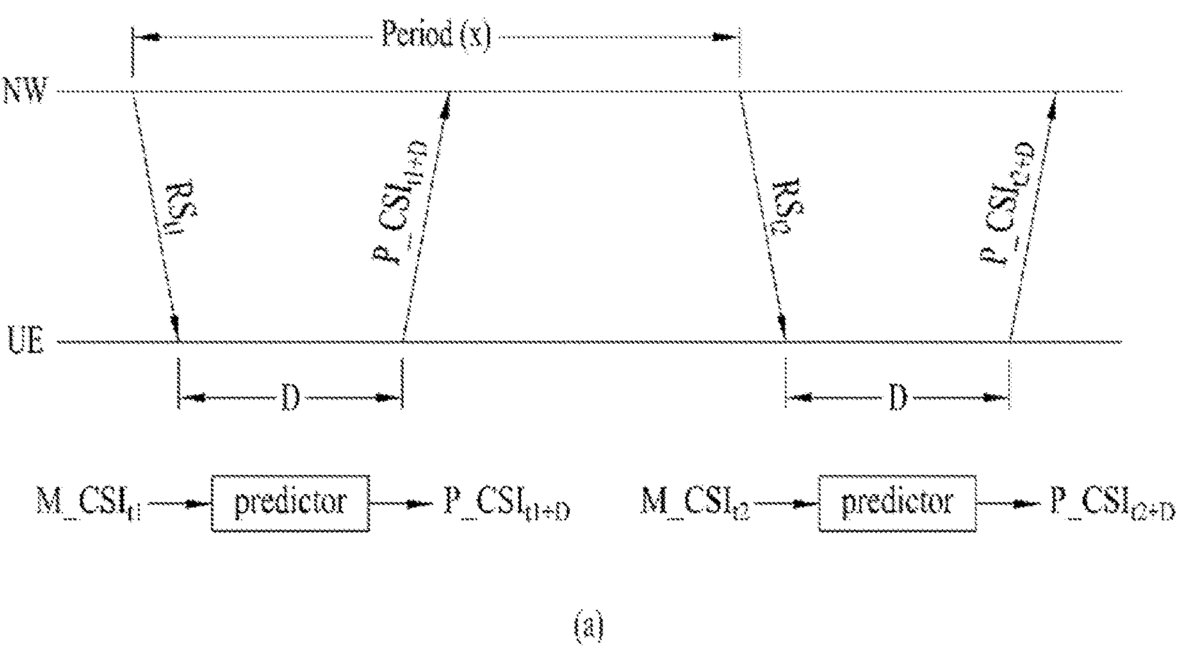
FIGS. 9 and 10 illustrate a CSI reporting process based on CSI prediction.
Figure 9:
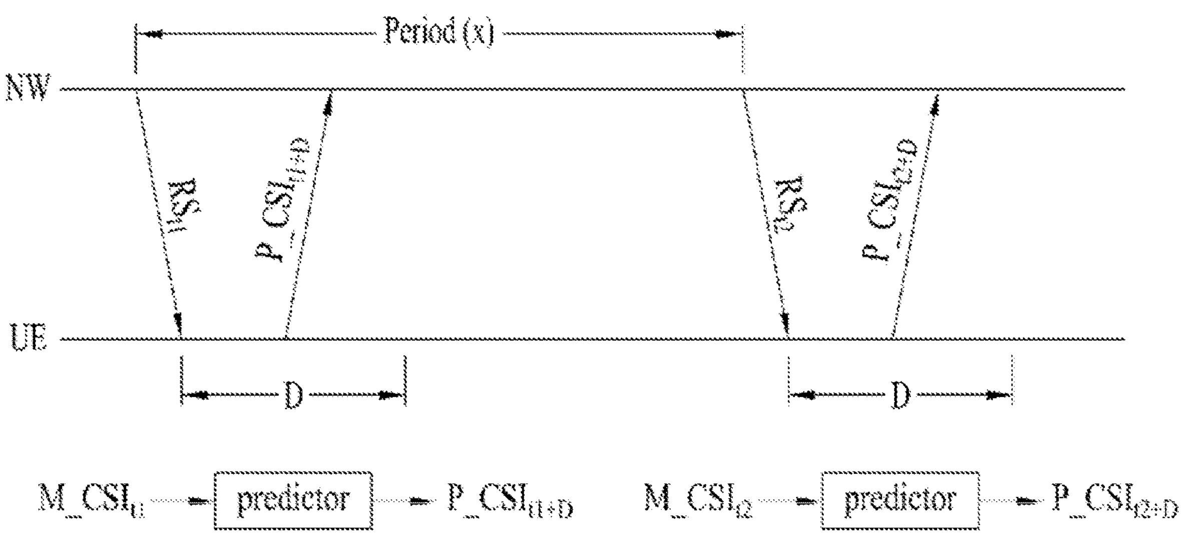

FIG. 9 illustrates an exemplary CSI reporting process, when a CSI predictor is implemented in a UE. As illustrated in FIG. 9, when the CSI predictor is implemented in the UE, the UE may derive predicted H[t+D] for time t+D based on H[t] measured at time t, and calculate predicted CSI for time t+D from the predicted H[t+D]. Accordingly, the UE may transmit the predicted CSI at time t+D to the BS. However, when the CSI predictor is implemented only in the UE, the BS may receive a report of more accurate predicted CSI from the UE, which is more up to date or applicable in the near future. However, the predicted CSI reported from the UE may still be outdated CSI depending on a reporting periodicity. That is, even if the predicted CSI is reported to the BS, the predicted CSI may still be outdated CSI before the BS receives a next CSI report. Moreover, since the policy of conventional cellular communication is carried out through NW configuration-based UE management, channel information measured by the UE should be reported to the BS to allow the NW to configure resources and parameters of the UE.

Figure 10:
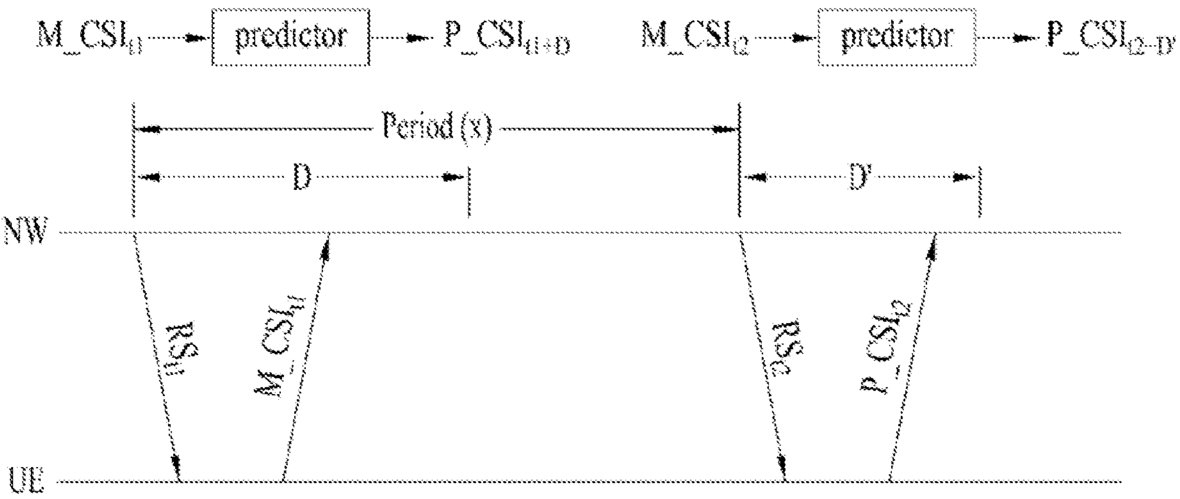

For this reason, it may be preferred to implement a CSI predictor in the BS, and a CSI reporting method in the case of implementing a CSI predictor in the BS may be considered. FIG. 10 illustrates a CSI reporting process, when a CSI predictor is implemented in a BS. Referring to FIG. 10, the BS may derive predicted H[t+D] for time t+D through the CSI predictor based on a CSI feedback at time t received from a UE and past CSI values received prior to that time. This allows the BS to more accurately derive a channel state at a desired time. The BS may configure PHY/MAC parameters for the UE and allocate radio resources appropriately (e.g., PDSCH resource allocation and PUSCH resource allocation), based on the predicted CSI. When the CSI predictor is implemented in the BS, the BS may predict a channel state value at any time point, which may solve the problem of outdated CSI. However, for more accurate prediction, it is still necessary to continuously or discontinuously receive CSI reports for past time points from the UE. In other words, even if the CSI predictor is implemented in the BS, CSI prediction still requires feedback information from the UE.

Conventional CSI prediction has the limitation that CSI reporting is still required to predict an accurate channel state. Specifically, when the CSI predictor is implemented in the UE, it may still suffer from the problem of outdated CSI unless a CSI reporting period is short. Further, when the CSI predictor is implemented in the BS, periodic CSI feedback reporting is required to ensure accurate CSI prediction in the BS.

To address the above problems of the prior art, the disclosure proposes a dynamic CSI reporting technique in which RS measurement and CSI reporting are performed based on an AI-based CSI predictor shared between a UE and an NW (e.g., a BS), only when needed. For example, the disclosure proposes a method of dynamically determining whether to perform CSI reporting according to an event, based on predicted CSI derived from a CSI predictor trained to predict CSI for a future time point. Herein, it is assumed that the UE and the BS share the same artificial intelligence/machine learning (AI/ML) model that may predict a channel/CSI for a time point in the near future. Therefore, it may be determined whether the UE is to perform measured CSI reporting according to a specified/configured event, based on a predicted CSI value.

The description of the disclosure is based on the following assumptions.

- A CSI predictor including a deep neural network (DNN) trained on the same dataset is implemented equally in the NW (e.g., the BS) and the UE.
- The NW (e.g., the BS) and the UE share the same AI/ML model that may predict a channel/CSI. For example, a UE that has newly entered a cell may download training results (e.g., a set of weights) for the AI/ML model from the BS, or a model trained on the same data may be preloaded on the NW and the UE. Alternatively, this may imply that models with nearly similar/same predictor performance are used.
- Inputs to the shared model may include various environmental factors (e.g., temperature, weather, time, frequency information, and so on) as well as CSI/channels at past time points. A value used as an input may be shared equally between the UE and BS in some way in advance (e.g., application-level or RAN-level signaling such as assistance information). An output from the shared model may be predicted CSI (e.g., CQI, PMI, RI, LI, CRI, SSBRI, and so on) for a specific predetermined/preset future time point.

Herein, measured CSI transmitted by the UE to the BS represents a channel state, which may be represented in various forms as follows. The UE/the BS transmitting/receiving the measured CSI may use the transmitted/received measured CSI as a channel information input for next CSI prediction.

- Layer indicator (LI), rank indicator (RI), CQI, PMI, CSI-RS resource indicator (CRI)/SS/PBCH resource block indicator (SSBRI); or
- a channel matrix H or noise (N) information measured by the UE; or
- information processed in a specific form to reduce signaling overhead.

Events proposed by the disclosure may be defined as follows. One or more of the following events may be set together in combination by the BS. However, the operations of the disclosure are not limited to the following events. The reason for defining events is to determine situations that may require a new PHY/MAC configuration based on channel prediction, using a predicted CSI value without signaling from the BS, and to ensure that measured CSI is reported through actual RS measurement, for the accuracy of predicted CSI. One or more events may be set UE-specifically or cell-specifically by the BS. CSI reporting may be performed selectively/dynamically only for the set events.

In the following, $P\_CSI_{t+x}$ represents predicted CSI for time t+x, and $M\_CSI_{t+x}$ represents measured CSI at time t+x.

Event 1 (E1): P_CSIt+x and M_CSIt+x values do not match, that is, the predicted and measured values for the same time point are different. This may correspond to a case in which receiving an RS for measurement is prioritized, and previous prediction is determined as incorrect.

Event 2 (E2): $P\_CSI_{t+x}$ is less than a specific threshold, that is, it is predicted that the channel state will become poor.

Event 3 (E3): $P\_CSI_{t+x}$ is greater than the specific threshold value, that is, it is predicted that the channel state will become better.

Event 4 (E4): The difference between the values of $P\_CSI_{t+x}$ and $P\_CSI_t$ is equal to or greater than a threshold, that is, it is predicted that the channel changes rapidly.

Event 5 (E5): A (CSI) timer has expired, that is, there has been no CSI feedback for a specific time period. E5 may be used to complement E1 to E4. For example, when CSI feedbacks are continuously dropped for a specific time period based on E1 to E4, a CSI feedback may be forced to be transmitted to maintain the accuracy/reliability of CSI prediction based on the latest CSI.

Thresholds used for E2 to E4 may be set independently for the respective events. For example, a threshold (e.g., a first threshold) for E2 may be set less than a threshold (e.g., a second threshold) for E3.

Further, the UE may receive at least one of the following pieces of information from the BS through a CSI reporting configuration information message and/or an RS resource configuration information message.

Resource information for RS resources and CSI reporting

Slot offset for RS/CSI in aperiodic reporting-based case

Slot offset for RS/CSI in periodic reporting-based case

Information about predicted CSI deriving period (CSI prediction period)

This may be configured in conjunction with the RS resource information, or conversely, the RS resource information may be configured in conjunction with the CSI prediction period. Alternatively, the CSI prediction period may be configured independently of the RS resource information. When the CSI prediction period is configured independently, a channel state may be measured or CSI may be reported, using the first RS or feedback resources after occurrence of an event.

This is a parameter indicating the prediction period, which is time synchronization information for the UE and the BS to predict CSI at the same time, and use the predicted CSI value for the same time to identify whether an event is satisfied.

Event information (E1/2/3/4/5) to be configured and parameter information (a threshold and a timer value) related to a configured event.

Figure 11:
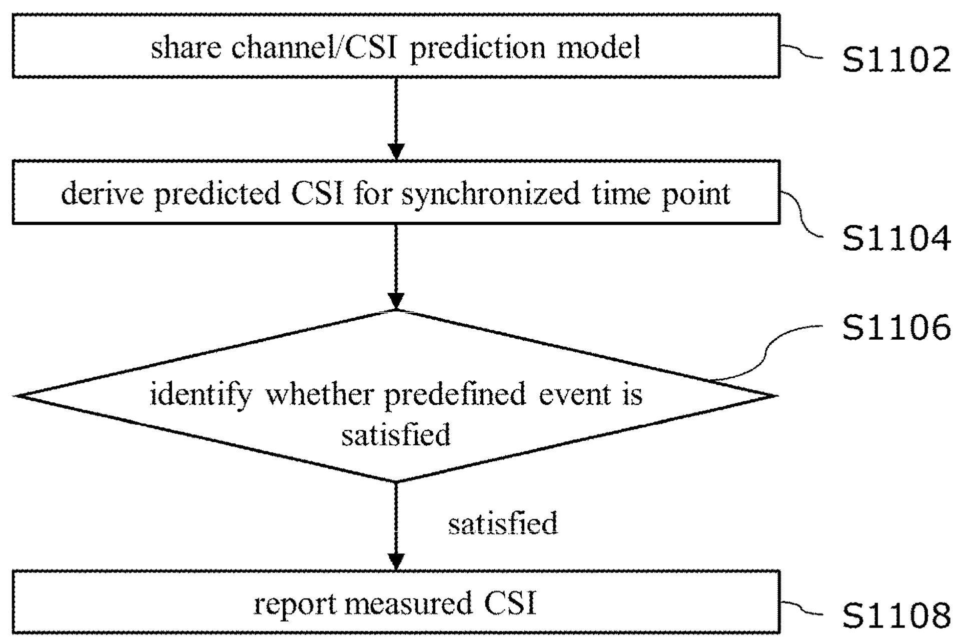
FIGS. 11 to 17 illustrate a CSI reporting process according to an example of the disclosure.

FIG. 11 illustrates an exemplary CSI reporting process according to an example of the disclosure. Referring to FIG. 11, a UE and an NW (e.g., a BS) may share a channel/CSI prediction model (S1102). For example, a UE which has newly entered a cell may download training results (e.g., a set of weights) for an AI/ML model from the BS, or the NW and the UE may be preloaded with a model trained on the same data. In addition, the UE may receive CSI configuration information from the BS (not shown). The CSI configuration information may include CSI reporting configuration information, CSI-RS resource configuration information, and/or event (e.g., see E1 to E5) configuration information. For each configuration information, the above description may be referred to. The UE and the BS may then derive predicted CSI for a synchronized time point (S1104). The UE may identify whether an event is satisfied, based on the predicted CSI (S1106) and, when the event is satisfied, report measured CSI for the synchronized time point (S1108). On the contrary, when the event is not satisfied, the UE may omit/skip/drop the reporting (process) of the measured CSI for the synchronized time point (not shown). When the UE has reported the measured CSI to the BS, the UE may use the measured CSI to derive predicted CSI for a next synchronized time point. On the contrary, when the UE has not reported the measured CSI to the BS, the UE may use the predicted CSI for the current synchronized time point to derive the predicted CSI for the next synchronized time point. The BS may perform an operation of detecting measured CSI at each synchronized time point, because the BS does not know whether the event is satisfied. Accordingly, upon detection of the measured CSI, the BS may use the measured CSI to derive predicted CSI for the next synchronized time point. On the contrary, when failing to detect the measured CSI, the BS may use predicted CSI for the current synchronized time point to derive the predicted CSI for the next synchronized time point.

The proposal of the disclosure may be largely divided into two embodiments, depending on an RS transmitted from the BS and a configured event. Each embodiment will be described in more detail below.

1. Dynamic CSI Reporting in the Presence of Periodic RS Transmission/Measurement The UE determines whether to report CSI based on a periodically transmitted RS and thus determines whether to use CSI feedback resources.

Case 1. When the NW periodically configures both an RS resource configuration and CSI feedback resources, a method of using the reserved CSI feedback resources is proposed.

Case 2. When the NW does not configure CSI feedback resources, a method of requesting CSI feedback resources by the UE is proposed.

2. Event-Based Dynamic CSI Reporting Based on Predicted CSI Variation

Whether to transmit an RS and whether to perform CSI reporting are synchronized between the NW and the UE based on an event. The event may be predefined or configured by the NW.

When the event is satisfied, RS transmission and CSI reporting are performed in specified resources without additional signaling.

A detailed description will be given below of an operation of each embodiment.

Dynamic CSI Reporting in the Presence of Periodic RS Transmission/Measurement

Figure 12:
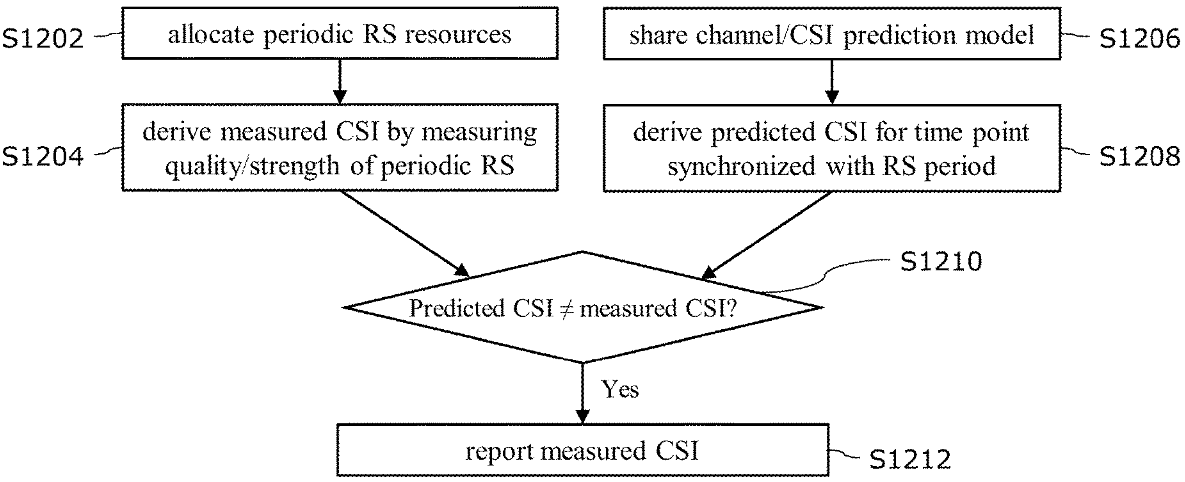

FIG. 12 illustrates an exemplary dynamic CSI reporting method, when an RS for channel measurement is periodically configured. The purpose of periodically configuring an RS is to identify the accuracy of predicted CSI by comparing actual CSI measured by a UE with CSI predicted by a CSI predictor. This method is preferably used, when E1 is configured for the UE. That is, the BS may allocate a periodic RS to the UE, together with the above-described information (e.g., CSI configuration information) and configure the UE to perform CSI reporting, for example, based on E1 (S1202). Accordingly, the UE may derive CSI (i.e., measured CSI) by measuring the periodic RS and thus measuring a signal quality/strength (S1204). The UE and an NW (e.g., a BS) share a channel/CSI prediction model (S1206), and the UE may predict CSI (for a future time point) (i.e., predicted CSI) by measuring the periodically transmitted RS (S1208). The predicted CSI may include CSI for a time point synchronized with an RS period. When there is a difference between the predicted CSI and the measured CSI (e.g., when the predicted CSI and the measured CSI are not the same, or when the difference between them exceeds a threshold) (S1210), the UE may determine that the predicted CSI is not based on accurate prediction, and report the measured CSI to the BS (S1212). The BS may predict next CSI more accurately based on the measured CSI received from the UE. When the measured CSI and the predicted CSI are the same (or when the difference between the predicted CSI and the measured CSI is less than or equal to the threshold), the UE may drop transmission of a CSI feedback of the measured CSI.

The technique of the disclosure may be applied when, for a UE configured with a set of periodic CSI-RS/SSB resources, a BS and the UE may derive at least one predicted CSI within a period in which the CSI-RS/SSB resources are transmitted, using the same CSI predictor. For example, the BS and the UE may derive predicted CSI for the same time point, using a configured prediction period and RS resource information. For this purpose, the UE and the BS preferably synchronize values input to the CSI predictor, using the prediction period and the RS resource information. That is, an output value for the same time point is preferably used as an input to the CSI predictor at an interval of a period determined between the BS and the UE. For example, an input value for deriving an output value $P\_CSI_{t+x}$ for a synchronized time point is preferably an input value $CSI_t$ for a time point agreed between the UE and BS. On the other hand, the BS/UE may derive a predicted CSI value $P\_CSI_{t+a}$ for any time point (e.g., t+a) at any time within time point t to time (t+a) depending on the BS/UE implementation.

Figure 13:
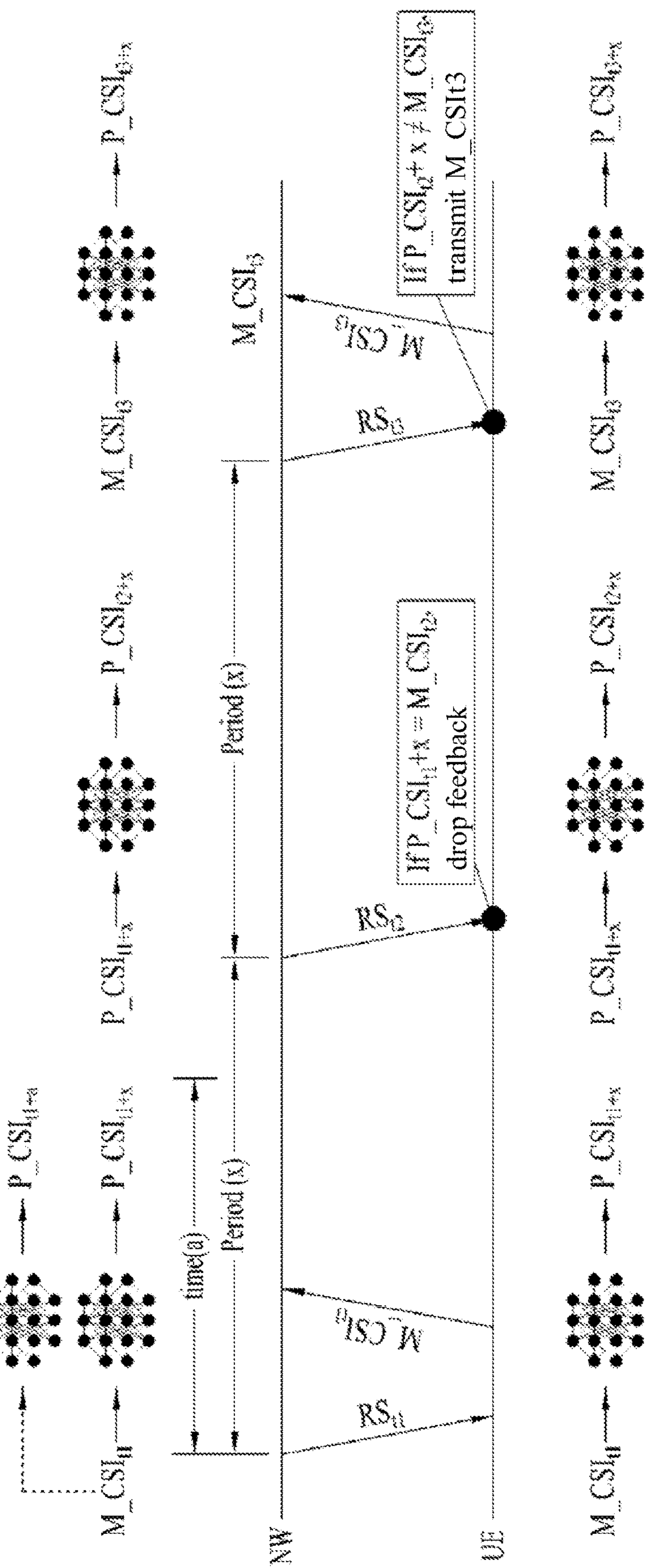

As illustrated in FIG. 13, the UE may derive an actual measured CSI value for a configured CSI element by measuring the signal strength/quality of periodically transmitted CSI-RS/SSB resources, and compare the values of measured CSI (hereinafter, $M\_CSI_t$) and predicted CSI (hereinafter, $P\_CSI_t$) for time t. When $M\_CSI_t$ and $P\_CSI_t$ have the same value (or when the difference between $M\_CSI_t$ and $P\_CSI_t$ is equal to or less than a threshold), the UE may skip reporting $M\_CSI_t$ for the corresponding RS. When the BS has not received a CSI report for a CSI-RS/SSB, the BS may still use predicted CSI for the same time t derived by the CSI predictor of the BS, for next CSI prediction. That is, the BS may use the predicted CSI derived at the current time t as an input for CSI prediction for a next time point (t+x). However, when there is a difference between $M\_CSI_t$ and $P\_CSI_t$ (or when the difference between $M\_CSI_t$ and $P\_CSI_t$ is greater than the threshold), the UE may determine that the CSI prediction for time t derived at a previous time point has an error, and report the measured CSI for time t to the BS. In this case, the BS may use the measured CSI (t) received from the UE as an input value for CSI prediction for the next time point (t+x). The same determination of an input value for CSI prediction is applied to the UE. That is, when the measured CSI is different from the predicted CSI, the measured CSI is transmitted to the BS, and used as an input value for predicting CSI for the next time point.

Figure 14:
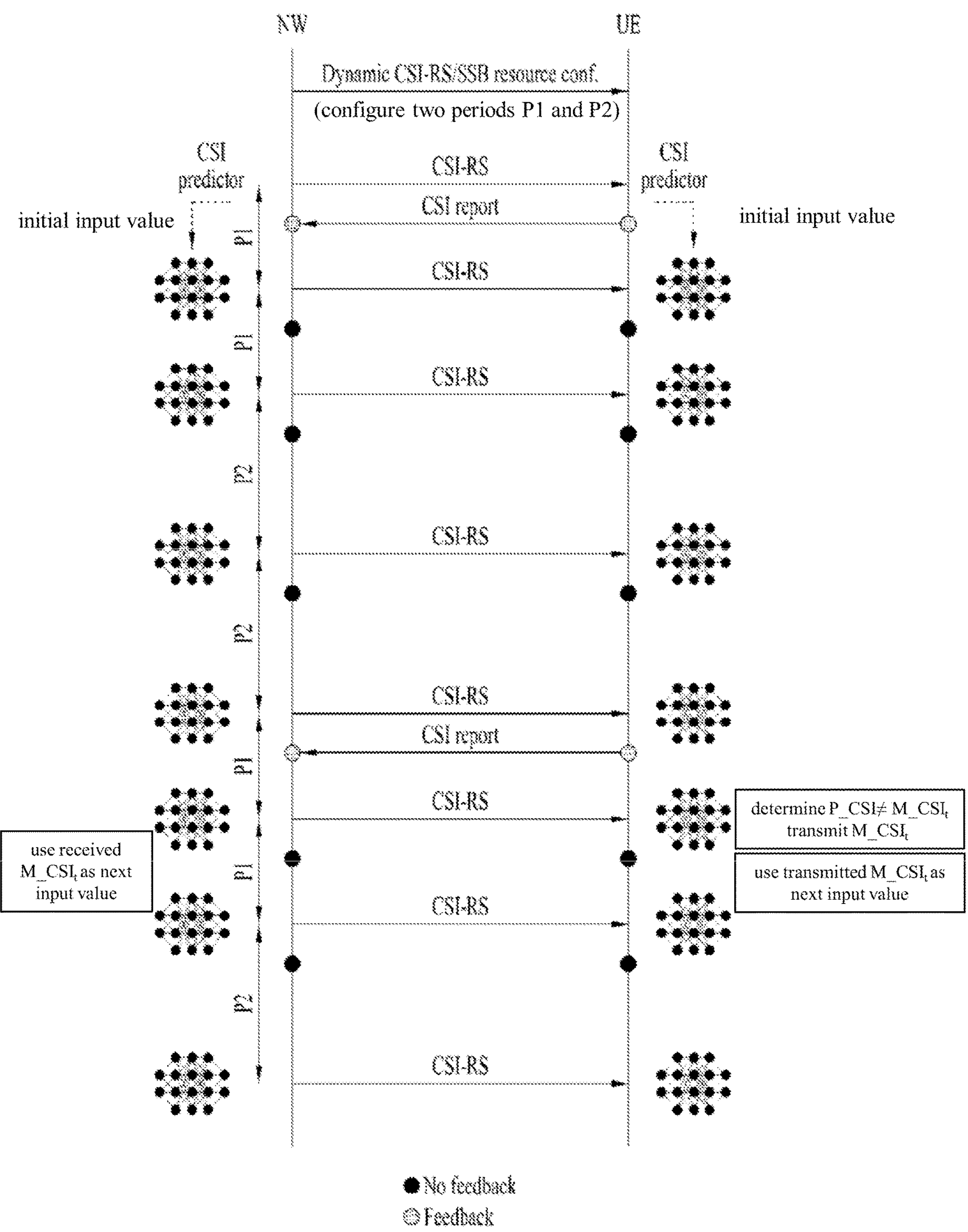

FIG. 14 illustrates a method of configuring a dynamic RS period according to a proposal of the disclosure. Referring to FIG. 14, the proposed technique of the disclosure includes a dynamic CSI-RS configuration method in which the transmission period of an RS is dynamically changed based on whether measured CSI is transmitted. For example, a UE configured with a periodic CSI-RS/SSB resource set may dynamically apply a CSI-RS/SSB resource transmission period according to drop of measured CSI reporting. For this purpose, dynamic CSI-RS/SSB resource configuration information may be transmitted from the NW (e.g., the BS) to the UE. The dynamic CSI-RS/SSB resource configuration information may include additional information for dynamically configuring a CSI-RS/SSB resource period. Conventional CSI-RS/SSB resource/reporting configuration information may be transmitted in dynamic CSI-RS/SSB resource configuration information, or separately. The additional information may include at least one of event information for changing (e.g., increasing) an RS period or one or more variable period values (e.g., P1 and P2). The event information for changing (increasing) the period includes parameters defining various conditions that may cause the period to change. The event information for the period change (increase) may be defined in connection with drop of measured CSI reporting. For example, the event information may include at least one of the following pieces of information.

The number of dropped measured CSI reports (N, e.g., when two measured CSI reports are dropped, the RS period increases by one level): or A timer The timer may start when a feedback of measured CSI is dropped, and stop when the feedback is transmitted. When the timer expires, the period may be changed. A timer of a different size/length/value may be mapped according to the changed period.

Parameters may be configured in various manners to configure two or more periods with which RS resources may be dynamically configured. For example, the parameters for dynamically configuring RS resources may include the following.

n period values for configuring n levels of dynamic periods are set: or

The BS may set n period values with different magnitudes to increase and decrease an RS period. That is, in the case of a two-level dynamic period configuration, period values with two different magnitudes (e.g., P1 and P2) may be configured through the RRC (layer/message). For example, when two period values including 4 slots (P1) and 8 slots (P2), respectively are configured, the UE may drop CSI reporting. For convenience, it is assumed that a current RS transmission period is 4 slots, and the RS transmission period is configured to increase after CSI reporting is dropped twice. In this situation, when CSI reporting is dropped M (e.g., 2) times, the BS may transmit RS resources at an interval of a long period of 8 slots, and the UE that has dropped CSI reporting may measure the RS resources at the interval of the long period of 8 slots. In this case, the RS may be transmitted/measured at the interval of the long period of 8 slots until an event to decrease the period is satisfied. On the other hand, when the event to decrease the period is satisfied (e.g., CSI reporting is performed), the BS may adjust the RS transmission period to the shorter period of four slots, and the UE may measure the RS resources at an interval of the shorter period of four slots.

A default period, a maximum period, and/or a period unit value is configured.

The BS may configure a maximum period value together with a period increment or decrement unit, based on the default period. In this case, the UE may increase/decrease the period by a period unit each time based on the default period, depending on drop/transmission of CSI reporting. In this case, a maximum period and a minimum period which the period is allowed to reach may be set as the maximum period and the default period, respectively. Alternatively, a method of increasing/decreasing the period by a factor of n (e.g., n is an integer equal to or greater than 2) according to drop/transmission of a feedback based on the default period.

The period may be configured dynamically according to an event through configuration of other various values.

A CSI prediction period, which is a value for synchronizing a time point for which predicted CSI is derived between the BS and the UE, may be applied separately from a CSI-RS (transmission) period. That is, the BS and the UE may derive predicted CSI every prediction period, and use the derived predicted CSI as an input value for deriving CSI in a next period even if the CSI-RS is not transmitted. Deriving predicted CSI every prediction period includes deriving predicted CSI for a periodic time point (e.g., p*n+a) corresponding to the prediction period, where p represents the prediction period, n represents an integer equal to or greater than zero, and a represents an offset. p and a may be given in slots.

Figure 15:
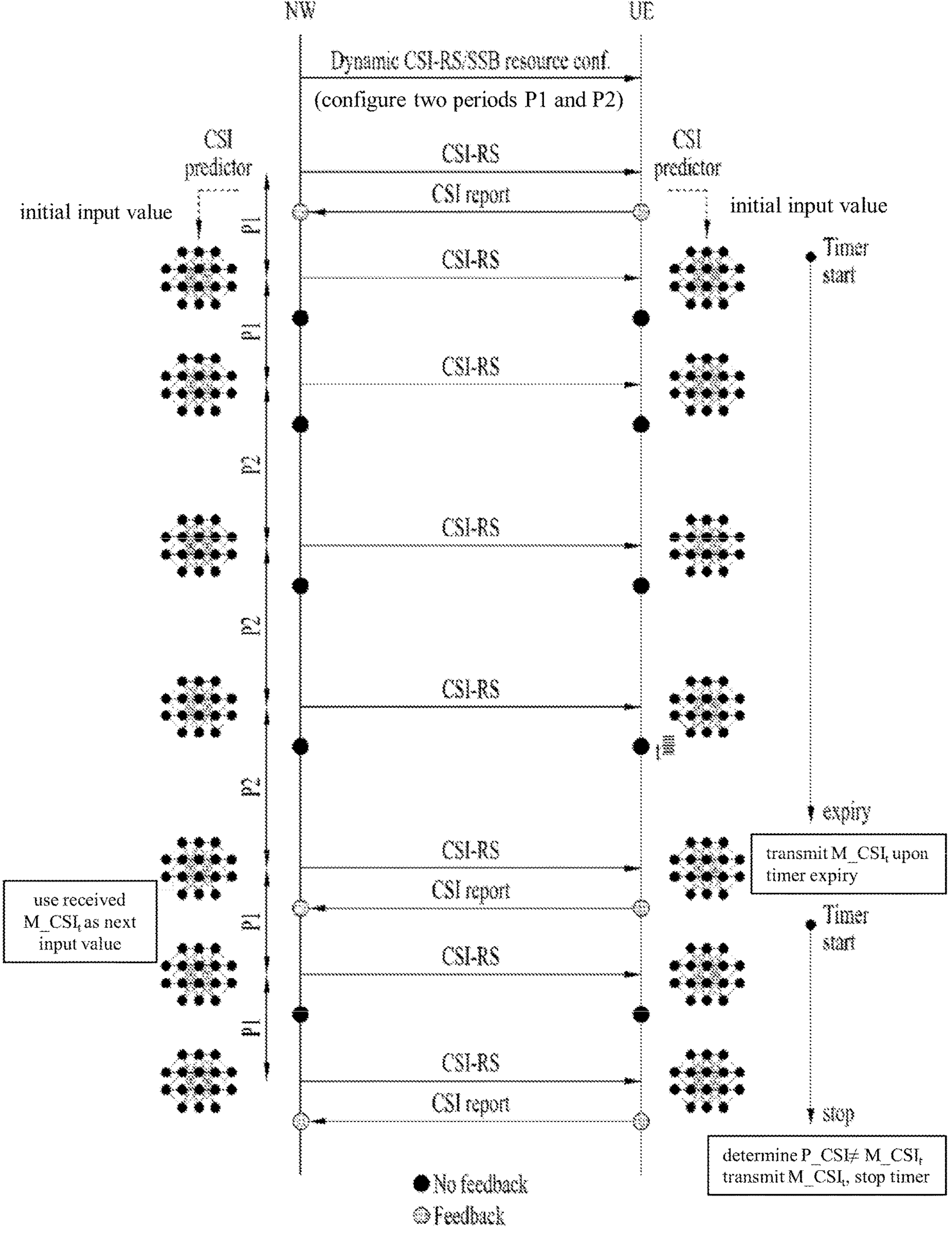

FIG. 15 illustrates a CSI reporting method based on a timer according to a proposal of the disclosure. Referring to FIG. 15, the proposed technique of the disclosure may configure, as one of events, a timer to cause a CSI feedback to be transmitted, when CSI feedbacks are successively dropped for a specific time after the last CSI feedback transmission, in order to prevent a CSI prediction error (see E5). This method may be configured in case the UE has performed CSI reporting, but there is an error in CSI report transmission according to a channel condition. In the event of a mismatch between the RS periods of the UE and the BS, the BS may predict incorrect CSI. Therefore, when CSI reporting is dropped for a specific time period, the timer is set to allow the UE to transmit measured CSI in spite of no difference between predicted CSI and the measured CSI, thereby handling an error situation. The timer is a device to prevent a CSI prediction error in the BS, which may be caused by successive drops of measured CSI or successive transmission errors of measured CSI. When a CSI feedback is omitted/dropped/skipped with no timer running, the timer starts, and when a CSI feedback is transmitted, the timer stops. When the timer expires, the UE may transmit measured CSI.

Further, the proposed technique of the disclosure includes a method of, when an NW periodically configures CSI feedback resources for CSI reporting, using PUCCH or PUSCH resources unused due to drop of measured CSI reporting for transmission of other information. Alternatively, the proposed technique of the disclosure may also include a method of requesting feedback resources for CSI reporting, when CSI feedback resources are not periodically allocated for measured CSI.

First, a method of, when CSI feedback resources are omitted, using the omitted resources will be described. A UE configured with periodic CSI-RS/SSB resource information may also be periodically configured with CSI feedback resources. When the UE determines to omit/drop/skip CSI reporting according to the proposed method, the UE may not use allocated CSI feedback resources. In this case, although the UE may not transmit any information in the allocated CSI feedback resources, the UE may use the CSI feedback resources to transmit other information, when there is UL information that needs to be transmitted. To transmit other information, an indicator field may be defined to indicate whether information transmitted in the CSI feedback resources includes information for CSI reporting or other information. For this purpose, when CSI feedback resources are configured, a field with a length of n bits may be set depending on the type of information that may be included in addition to a CSI feedback, as determined by the BS. Herein, n includes an integer equal to or greater than 1. This method is applicable in the case where the CSI feedback resources are PUCCH resources or PUSCH resources, and the CSI feedback resources may be reused to transmit UL control information such as an SR or an HARQ A/N.

Considering the possibility of occurrence of a detection error in CSI feedback resources whose transmission is omitted/skipped/dropped by the UE at the BS side, it may be preferable to use CRC-added PUCCH/PUSCH resources for CSI transmission.

Alternatively, the BS may not periodically allocate feedback resources for measured CSI. That is, although the BS periodically configures RS resources for CSI, the BS may allocate feedback resources for CSI reporting, only when requested by the UE, in anticipation of infrequent CSI reporting. This method is preferably applied when CSI reporting is mostly dropped by CSI prediction. A CSI feedback request may be performed in the following methods.

- In the presence of available PUSCH resources, a CSI report is transmitted through a MAC CE, or multiplexed in a specific RS of a PUSCH, for transmission.
- One of SR PUSCH resources is allocated as a resource for a CSI feedback request.
- In current NR, one or more SR PUCCH resources may be allocated to one UE, and SR PUCCH resources may be configured on a logical channel basis or for beam failure recovery (BFR). In this method, an additional SR PUCCH may be allocated/used for the purpose of requesting CSI reporting resources. Upon receipt of an SR PUCCH requesting allocation of CSI reporting resources, the BS may allocate PUCCH or PUSCH resources for CSI reporting to the UE by a MAC CE, DCI, or an RRC message. The UE may use the allocated resources to perform aperiodic CSI reporting.
- In addition, an SR PUCCH (hereinafter, referred to as an SR PUCCH for CSI) may be further allocated/used to activate suspended CSI PUCCH resources arbitrarily allocated by the BS. The suspended CSI PUCCH resources mean resources that have been pre-allocated by a message configuring RS information and/or CSI-related information, but remains suspended until a CSI PUCCH activation indicator (e.g., an SR PUCCH for CSI) is transmitted from the UE. Transmission of an SR PUCCH for CSI means signaling activation of PUCCH resources for CSI. For example, the UE may transmit an SR PUCCH for CSI and then transmit a CSI report using the suspended CSI PUCCH resources (without any response from the BS).
- Configuration of PUCCH resources for requesting CSI reporting resources
- PUCCH resources available to request a CSI feedback are configured. Different PUCCH resources may be configured on a UE basis or on a CSI element basis.

Event-Based Dynamic CSI Reporting Based on Predicted CSI Variation

The BS may define an event for RS transmission/measurement and CSI reporting. This method is intended to drop/minimize RS transmission/measurement and CSI reporting when a channel is stable, and transmit/receive an RS measurement and a CSI report at frequent intervals when a channel change is large, based on a variation of a CSI value derived from the CSI predictor without additional signaling between the NW and the UE. CSI predictors may be implemented in both the BS and the UE.

According to the proposal of the disclosure, an RS for CSI measurement (e.g., CSI-RS) may not be transmitted periodically from the BS. On the other hand, the UE may expect the RS to be transmitted, when an event defined/configured by the BS is satisfied. As such, a UE configured with dynamic CSI reporting without no periodic RS transmission by the BS may require at least n actual measured CSI values as an initial input for deriving predicted CSI from the CSI predictor. Herein, n may be an integer equal to or greater than 1, and preferably equal to or greater than 2. This means that CSI reporting is performed based on actual RS transmissions as many times as set by the BS or defined in the specification. The UE may receive RS resource information and reporting configuration information for CSI reporting from the BS. In addition, the UE may be configured with one or more of the proposed events (E1 to E5) of the disclosure. Upon receipt of a configuration message, the UE may perform CSI reporting at least once to obtain an initial input value for the CSI predictor. Using an actual CSI report as the initial input value, the UE and the BS may derive predicted CSI for a predetermined future time $t_i$ according to a predetermined period. When at least one of the events is satisfied based on the predicted CSI value, the BS and the UE may transmit and receive an RS in next available RS resources after the event occurs. In this case, the UE may measure the RS and perform CSI reporting (i.e., measured CSI). The UE and BS that have transmitted and received the CSI report may use the measured CSI value as an input value for next CSI prediction.

Figure 16:
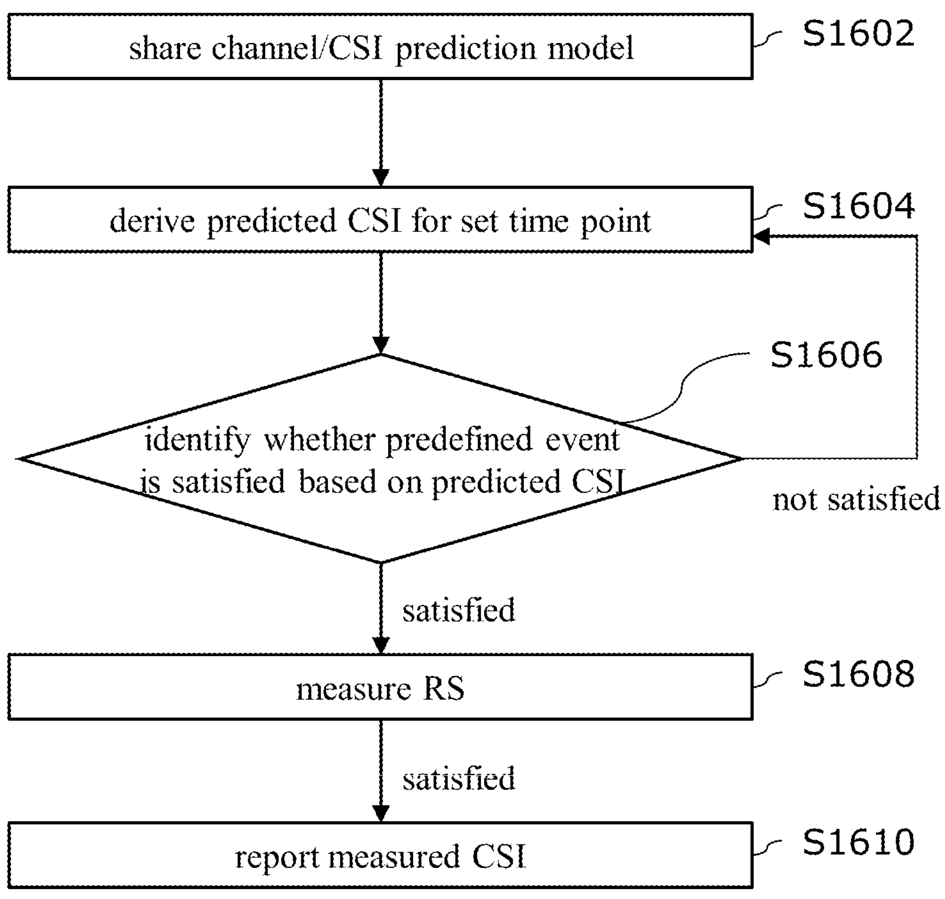

FIG. 16 illustrates an exemplary CSI reporting process according to the disclosure. Referring to FIG. 16, a UE and an NW (e.g., BS) may share a channel/CSI prediction model (S1602). For example, a UE which has newly entered a cell may download training results (e.g., a set of weights) for an AI/ML model from the BS, or the NW and the UE may be pre-loaded with a model trained on the same data. In addition, the UE may receive CSI configuration information from the BS (not shown). The CSI configuration information may include CSI reporting configuration information, CSI-RS resource configuration information, and/or event configuration information. The UE and the BS may then derive predicted CSI for a synchronized time point (S1604). Based on the predicted CSI, the UE may identify whether an event is satisfied (S1606), measure an RS when the event is satisfied (S1608), and report measured CSI for a synchronized time point (S1610). The RS may not be transmitted periodically, and (when the event is satisfied) may be transmitted or received in next available RS resources after the event occurs. On the contrary, when the event is not satisfied, the UE may omit/skip/drop reporting (a reporting process) of the measured CSI for the synchronization time point (not shown). When the measured CSI is reported to the BS, the UE may use the measured CSI to derive predicted CSI for a next synchronized time point. When the measured CSI has not been reported to the BS, the UE may use the predicted CSI for the current synchronized time point to derive predicted CSI for a next synchronized time point.

Figure 17:
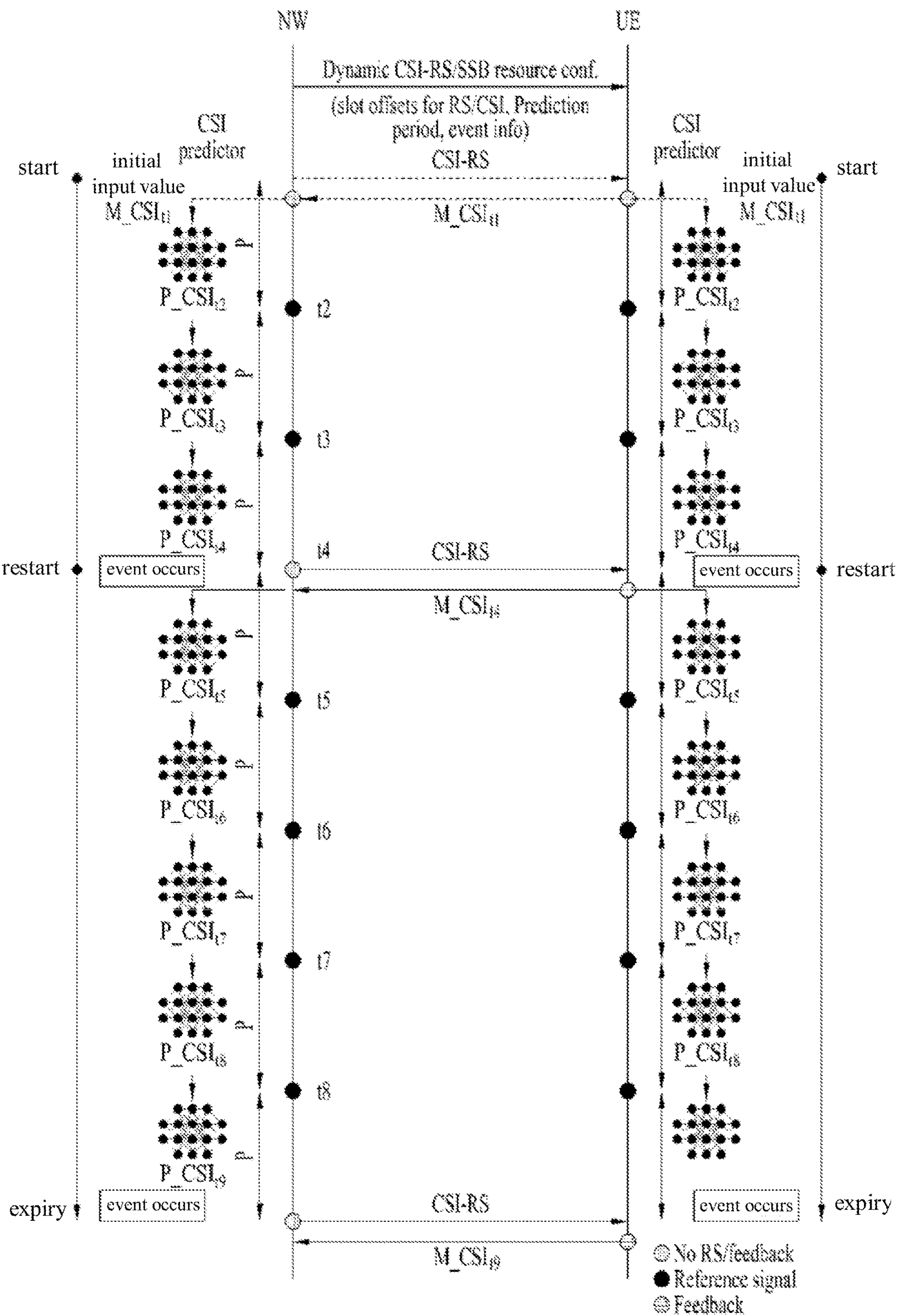

FIG. 17 illustrates an exemplary CSI reporting process, when a CSI timer-based event is configured. The basic process of FIG. 17 is the same as FIG. 16, except that a timer-based event is configured in addition to the process of FIG. 16. When a CSI timer-based CSI reporting event is also configured by a message (Dynamic CSI-RS/SSB resource conf) that configures dynamic CSI reporting, the BS and the UE may (re) start a CSI timer at the time of CSI reporting or CSI-RS transmission/reception, and perform CSI-RS transmission/reception and CSI reporting, when the timer expires.

According to the proposed technique of the disclosure, the accuracy of CSI prediction may be increased, and timely CSI derivation is possible. Further, according to the proposed technique, CSI-RS transmission/reception, and CSI reporting are performed based on a preset event, which may reduce signaling overhead by enabling CSI reporting according to a situation without an additional configuration/signaling.

The various descriptions, functions, procedures, proposals, methods, and/or operational flowcharts proposals of the disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

In the disclosure, the at least one memory (e.g., 104 or 204) may store instructions or programs, and the instructions or programs may cause, when executed, at least one processor operably connected to the at least one memory to perform operations according to some embodiments or implementations of the disclosure.

In the disclosure, a computer readable storage medium may store at least one instruction or program, and the at least one instruction or program may cause, when executed by at least one processor, the at least one processor to perform operations according to some embodiments or implementations of the disclosure.

In the disclosure, a computer program may be recorded in at least one computer-readable (non-volatile) storage medium, and may include a program code that causes (at least one processor) to perform an operation when being executed according to some embodiments or implements of the disclosure. The computer program may be provided in the form of a computer program product. The computer program product may include at least one computer readable (non-volatile) storage medium, and the computer readable storage medium may include a program code that causes (at least one processor) to perform an operation when being executed according to some embodiments or implements of the disclosure.

In the disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the disclosure.

A communication device of the disclosure includes at least one processor; and at least one computer memory operably connected to the at least one processor and configured to store instructions for causing, when executed, the at least one processor to perform operations according to example(s) of the disclosure described later.

Figure 18:
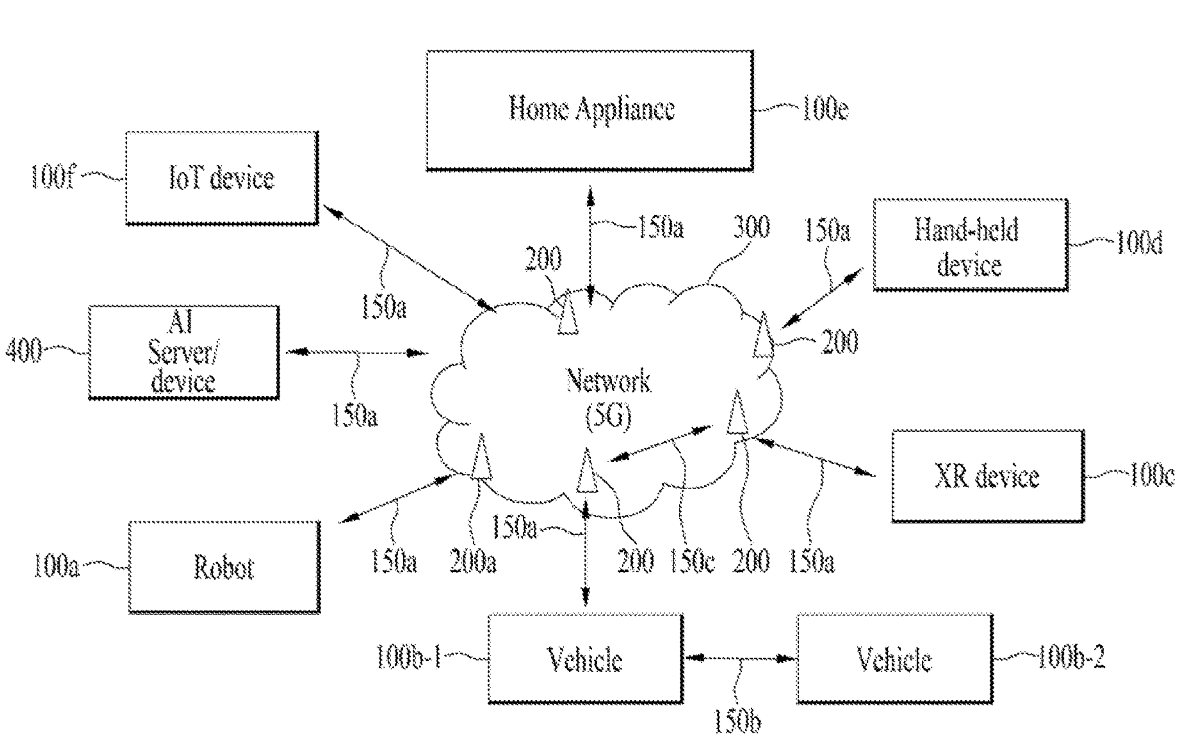
FIGS. 18 to 21 illustrate a communication system 1 and wireless devices, which are applied to the disclosure.

FIG. 18 illustrates a communication system 1 applied to the disclosure.

Referring to FIG. 18, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Figure 19:
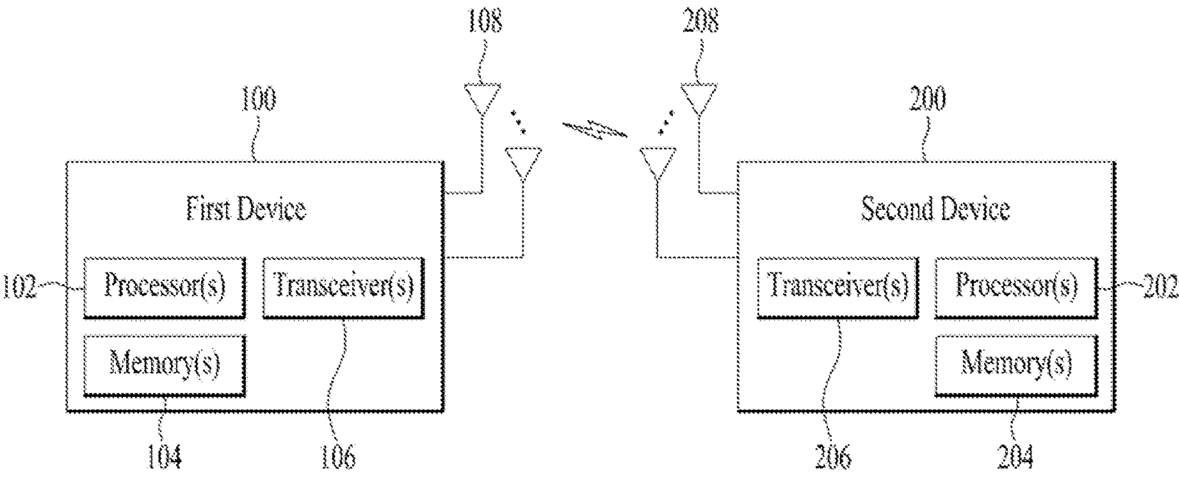

FIG. 19 illustrates wireless devices applicable to the disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
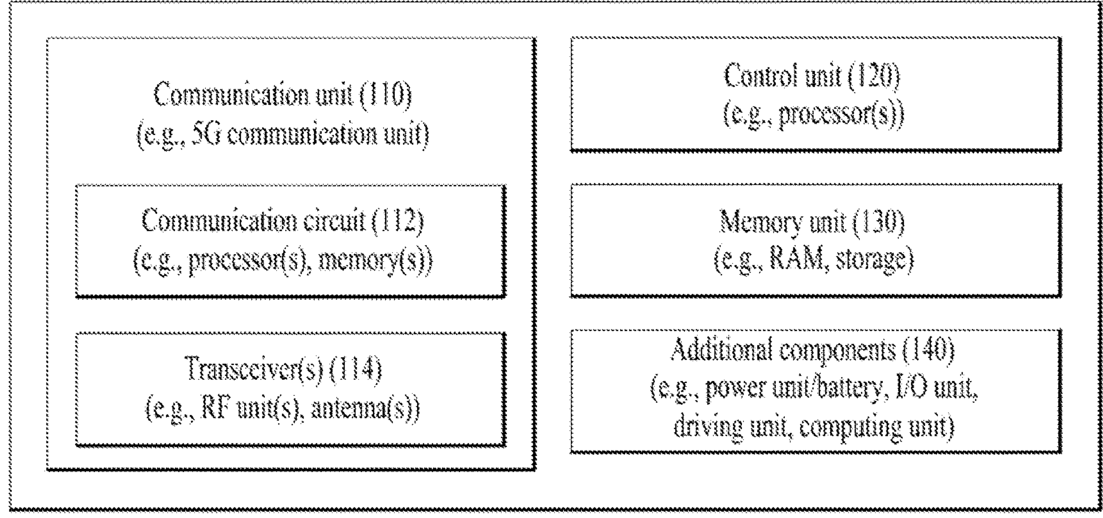

FIG. 20 illustrates another example of a wireless device applied to the disclosure. The wireless device may be implemented in various forms according to a use-case/service (refer to FIG. 18).

Referring to FIG. 20, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 21:
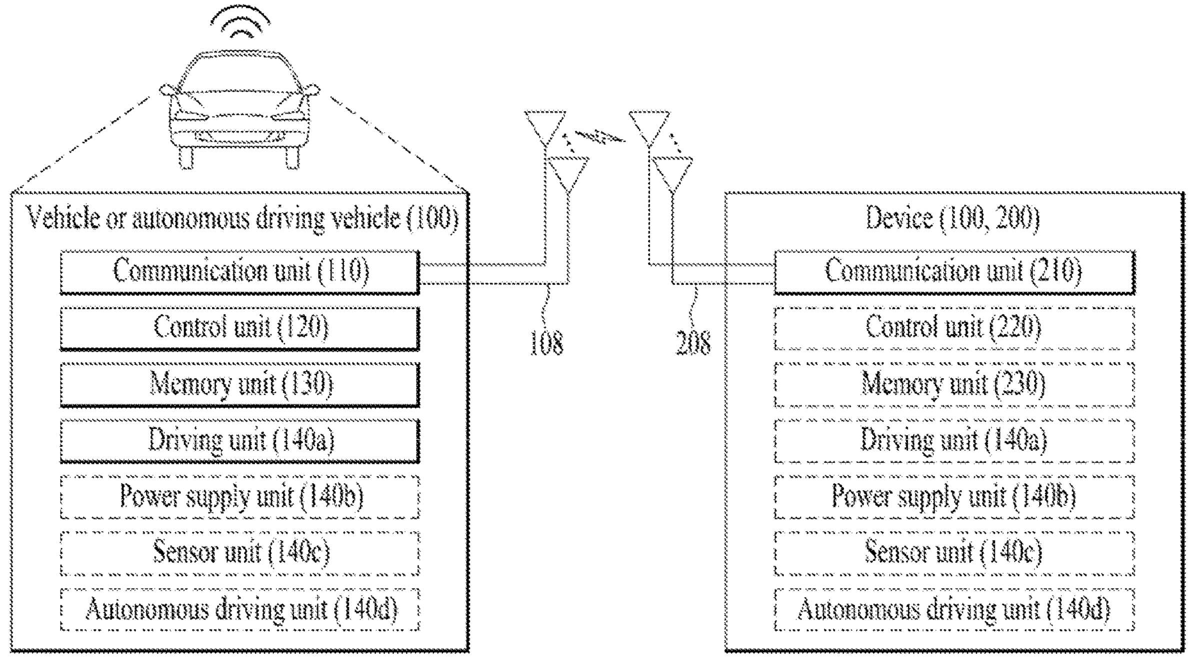

FIG. 21 illustrates a vehicle or an autonomous driving vehicle applied to the disclosure. The vehicle or autonomous driving vehicle may be implemented by a mobile robot, a car, a train, a manned/unmanned Aerial Vehicle (AV), a ship, etc.

Referring to FIG. 21, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the disclosure in prescribed forms. And, the respective elements or features may be considered as selective unless they are explicitly mentioned. Each of the elements or features may be implemented in a form failing to be combined with other elements or features. Moreover, it is able to implement an embodiment of the disclosure by combining elements and/or features together in part. A sequence of operations explained for each embodiment of the disclosure may be modified. Some configurations or features of one embodiment may be included in another embodiment or may be substituted for corresponding configurations or features of another embodiment. And, it is apparently understandable that an embodiment is configured by combining claims failing to have relation of explicit citation in the appended claims together or may be included as new claims by amendment after filing an application.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The disclosure is applicable to UEs, eNBs or other apparatuses of a wireless mobile communication system.

The invention claimed is:

1. A method of transmitting channel state information (CSI) by a user equipment (UE), the method comprising:
  receiving configuration information related to CSI prediction; and
  deriving predicted CSI for a second time point later than a first time point from CSI for the first time point, based on the configuration information,
  wherein based on the predicted CSI satisfying an event, actual CSI for the second time point, measured from a reference signal is transmitted, and
  wherein based on the predicted CSI not satisfying the event, CSI reporting for the second time point is dropped.

2. The method of claim 1, wherein the event includes a mismatch between the predicted CSI for the second time point and the actual CSI for the second time point.

3. The method of claim 1, wherein the event includes the predicted CSI for the second time point being less than a threshold.

4. The method of claim 1, wherein the event includes a difference between the predicted CSI for the second time point and the actual CSI for the second time point being equal to or greater than a threshold.

5. The method of claim 1, wherein the event includes expiration of a timer, and the timer starts based on the CSI reporting being dropped and ends based on the CSI reporting being transmitted.

6. A user equipment (UE) used in a wireless communication system, comprising:
  at least one radio frequency (RF) unit;
  at least one processor; and
  at least one computer memory operatively connected to the at least one processor, and when executed, causing the at least one processor to perform operations,
  wherein the operations include:
    receiving configuration information related to CSI prediction; and
    deriving predicted CSI for a second time point later than a first time point from CSI for the first time point, based on the configuration information,
    wherein based on the predicted CSI satisfying an event, actual CSI for the second time point, measured from a reference signal is transmitted, and
    wherein based on the predicted CSI not satisfying the event, CSI reporting for the second time point is dropped.

7. The UE of claim 6, wherein the event includes a mismatch between the predicted CSI for the second time point and the actual CSI for the second time point.

8. The UE of claim 6, wherein the event includes the predicted CSI for the second time point being less than a threshold.

9. The UE of claim 6, wherein the event includes a difference between the predicted CSI for the second time point and the actual CSI for the second time point being greater than a threshold.

10. The UE of claim 6, wherein the event includes expiration of a timer, and the timer starts based on the CSI reporting being dropped and ends based on the CSI reporting being transmitted.

11. An apparatus for a user equipment (UE), comprising:
  at least one processor; and
  at least one computer memory operatively connected to the at least one processor, and when executed, causing the at least one processor to perform operations,
  wherein the operations include:
    receiving configuration information related to CSI prediction; and
    deriving predicted CSI for a second time point later than a first time point from CSI for the first time point, based on the configuration information,
    wherein based on the predicted CSI satisfying an event, actual CSI for the second time point, measured from a reference signal is transmitted, and
    wherein based on the predicted CSI not satisfying the event, CSI reporting for the second time point is dropped.

12. The apparatus of claim 11, wherein the event includes a mismatch between the predicted CSI for the second time point and the actual CSI for the second time point.

13. The apparatus of claim 11, wherein the event includes the predicted CSI for the second time point being less than a threshold.

14. The apparatus of claim 11, wherein the event includes a difference between the predicted CSI for the second time point and the actual CSI for the second time point being greater than a threshold.

15. The apparatus of claim 11, wherein the event includes expiration of a timer, and the timer starts based on the CSI reporting being dropped and ends based on the CSI reporting being transmitted.

* * * * *